US009280535B2

(12) United States Patent
Varma et al.

(10) Patent No.: US 9,280,535 B2
(45) Date of Patent: Mar. 8, 2016

(54) NATURAL LANGUAGE QUERYING WITH CASCADED CONDITIONAL RANDOM FIELDS

(75) Inventors: Kishore Indukuri Varma, Hyderabad (IN); Srikumar Krishnamoorthy, Bangalore (IN); Radha Krishna Pisipati, Hyderabad (IN)

(73) Assignee: Infosys Limited, Bangalore (IN)

( * ) Notice: Subject to any disclaimer, the term of this patent is extended or adjusted under 35 U.S.C. 154(b) by 389 days.

(21) Appl. No.: 13/117,077

(22) Filed: May 26, 2011

(65) Prior Publication Data

US 2012/0254143 A1    Oct. 4, 2012

(30) Foreign Application Priority Data

Mar. 31, 2011  (IN) ............................ 1060/CHE/2011

(51) Int. Cl.
*G06F 7/00* (2006.01)
*G06F 17/30* (2006.01)
*G06F 17/27* (2006.01)

(52) U.S. Cl.
CPC ...... *G06F 17/2785* (2013.01); *G06F 17/30401* (2013.01)

(58) Field of Classification Search
CPC ................................................. G06F 17/30401
USPC .................................................. 707/760, 776
See application file for complete search history.

(56) References Cited

U.S. PATENT DOCUMENTS

| | | | |
|---|---|---|---|
| 4,688,195 A | 8/1987 | Thompson et al. | |
| 4,829,423 A | 5/1989 | Tennant et al. | |
| 5,083,268 A | 1/1992 | Hemphill et al. | |
| 5,197,005 A | 3/1993 | Shwartz et al. | |
| 5,377,103 A | 12/1994 | Lamberti et al. | |
| 5,442,780 A | 8/1995 | Takanashi et al. | |
| 5,495,604 A | 2/1996 | Harding et al. | |
| 5,696,962 A | 12/1997 | Kupiec | |
| 6,006,218 A * | 12/1999 | Breese et al. | 707/3 |
| 6,081,774 A | 6/2000 | De Hita et al. | |
| 6,173,279 B1 | 1/2001 | Levin et al. | |
| 6,321,372 B1 | 11/2001 | Poirier et al. | |
| 6,339,769 B1 * | 1/2002 | Cochrane et al. | 707/2 |
| 6,598,039 B1 | 7/2003 | Livowsky | |
| 7,027,975 B1 | 4/2006 | Pazandak et al. | |
| 7,398,201 B2 | 7/2008 | Marchisio et al. | |

(Continued)

OTHER PUBLICATIONS

"Welcome to JobQuery," <http://www.cs.utexas.edu/users/ml/jobquery/>, 1 page, accessed May 25, 2011.

(Continued)

*Primary Examiner* — Marc Somers
(74) *Attorney, Agent, or Firm* — Klarquist Sparkman, LLP

(57) ABSTRACT

A natural language query tool comprising cascaded conditional random fields (CRFs) (e.g., a linear-chain CRF and a skip-chain CRF applied sequentially) processes natural language input to produce output that can be used in database searches. For example, cascaded CRFs extract entities from natural language input that correspond to column names or column values in a database, and identify relationships between the extracted entities. A search engine can execute queries based on output from the cascaded CRFs over an inverted index of a database, which can be based on one or more materialized views of the database. Results can be sorted (e.g., according to relevance scores) and presented in a user interface.

26 Claims, 19 Drawing Sheets

(56) References Cited

U.S. PATENT DOCUMENTS

| | | | |
|---|---|---|---|
| 7,627,550 B1* | 12/2009 | Adams et al. | 707/2 |
| 8,473,430 B2* | 6/2013 | Yu et al. | 706/12 |
| 2006/0123000 A1* | 6/2006 | Baxter et al. | 707/5 |
| 2006/0136405 A1 | 6/2006 | Ducatel et al. | |
| 2007/0129936 A1* | 6/2007 | Wang et al. | 704/9 |
| 2009/0070300 A1* | 3/2009 | Bartels et al. | 707/3 |
| 2009/0083232 A1* | 3/2009 | Ives et al. | 707/3 |
| 2009/0222395 A1* | 9/2009 | Light et al. | 706/47 |
| 2009/0276417 A1* | 11/2009 | Shapira et al. | 707/5 |
| 2010/0076978 A1* | 3/2010 | Cong et al. | 707/738 |
| 2011/0078554 A1* | 3/2011 | Nie et al. | 715/234 |
| 2011/0270815 A1* | 11/2011 | Li | 707/706 |

OTHER PUBLICATIONS

"Welcome to Geoquery!," <http://www.cs.utexas.edu/users/ml/geo.html>, 2 pages, accessed May 25, 2011.

Bundschus et al., "Extraction of semantic biomedical relations from text using conditional random fields," *BMC Bioinformatics*, 14 pages, Apr. 23, 2008.

Indukuri et al., "Natural Language Querying over Databases Using Cascaded CRFs," ADBIS 2010, LNCS 6295, Novi Sad, Serbia, pp. 567-560, Sep. 20-24, 2010.

Grimes, "What's Next for Text—Text Analytics Today and Tomorrow: Market, Technology, and Trends," Alta Plana Corporation, <http://altaplana.com/WhatsNextForText.pdf>, 3rd Annual Text Analytics Summit USA, 12 pages, Boston, Jun. 12-13, 2007.

Agrawal et al., "The Claremont Report on Database Research," SIGMOD Record, vol. 37, No. 3, 11 pages, Sep. 2008.

The Apache Software Foundation, "Welcome to Apache Lucene!", <http://lucene.apache.org/>, 5 pages, 2010.

Bhalotia et al., "Keyword Searching and Browsing in Databases Using Banks," In ICDE, pp. 431-440, IEEE Computer Society, 2002.

Bunescu and Mooney, "Relational Markov Networks for Collective Information Extraction," *IMCL*-04, 7 pages, Banff, Alberta, Canada, 2004.

Bunescu, "Learning for Collective Information Extraction," Technical Report TR-05-02, Artificial Intelligence Lab, University of Texas, Austin, PhD Proposal, 45 pages, Oct. 2004.

Erickson, "Combining Semantics and Relational Database Theory," *Dr. Dobb's Portal*, <http://www.drdobbs.com/database/206904663>, 2 pages, Mar. 19, 2008.

Galley, "A Skip-chain Conditional Random Field for Ranking Meeting Utterances by Importance," Proceedings of the 2006 Conference on Empirical Methods in Natural Language Processing, 9 pages, Sydney, Australia, Jul. 2006.

Jayapandian and Jagadish, "Automated Creation of a Forms-based Database Query Interface," VLDB '08, 1(1), pp. 695-709, Auckland, NZ, Aug. 24-30, 2008.

Kuhn and De Mori, "The Application of Semantic Classification Trees to Natural Language Understanding," *IEEE Trans. Pattern Anal. Mach. Intell.*, 17(5), pp. 449-460, May 1995.

Lafferty et al., "Conditional Random Fields: Probabilistic Models for Segmenting and Labeling Sequence Data," *Proceedings of 18th International Conf. on Machine Learning*, San Francisco, CA, 8 pages, Jun. 28-Jul. 1, 2001.

Mador-Haim et al., "Controlled Language for Geographical Information System Queries," Proceedings of Fifth International Workshop on Inference in Computational Semantics, 10 pages, Apr. 2006.

McCallum, "Efficiently Inducing Features of Conditional Random Fields," Proceedings of the 19th Annual Conference on Uncertainty in Artificial Intelligence (UAI-03), pp. 403-410, Acapulco, Mexico, Aug. 2003.

McCallum et al., "Maximum Entropy Markov Models for Information Extraction and Segmentation," ICML '00: Proceedings of the 17th International Conference on Machine Learning, pp. 591-598, Stanford, CA, USA, Jun. 29-Jul. 2, 2000.

McCallum et al., "Dynamic Conditional Random Fields for Jointly Labeling Multiple Sequences," Proceedings of Workshop on Syntax, Semantics and Statistics (NIPS 2003), <www.cs.umass.edu/~mccallum/papers/dcrf-nips03.pdf>, 8 pages, Dec. 2003.

McCallum, "Mallet—Machine Learning for Language Toolkit," 2 pages, Feb. 4, 2011.

Mimno, "Machine Learning with MALLET," <http://mallet.cs.umass.edu/mallet-tutorial.pdf>, 120 pages, 2002.

Miller et al., "A Fully Statistical Approach to Natural Language Interfaces," Proceedings of the 34th Annual Meeting on Association for Computational Linguistics, pp. 55-61, Santa Cruz, CA, USA, Jun. 24-27, 1996.

Minock et al., "Towards Building Robust Natural Language Interfaces to Databases," NLDB '08: Proceedings of the 13th International Conference on Natural Language and Information Systems, pp. 187-198, London, 2008.

Mooney and Bunescu, "Mining Knowledge from Text Using Information Extraction," *SIGKDD Explor. Newsl.*, 7(1), pp. 3-10, Jun. 2005.

Stratica et al., "A Natural Language Processor for Querying Cindi," Proceedings of SSGRR 2002 Conference, L'Aquila, Italy, 11 pages, Jul. 29-Aug. 4, 2002.

Popescu et al., "Modern Natural Language Interfaces to Databases: Composing Statistical Parsing with Semantic Tractability," COLING '04: Proceedings of the 20th International Conference on Computational Linguistics, 7 pages, Geneva, Aug. 23-27, 2004.

Popescu et al., "Towards a Theory of Natural Language Interfaces to Databases," IUI '03: Proceedings of the 8th International Conference on Intelligent User Interfaces, 9 pages, Miami, FL, USA, Jan. 2003.

Rabiner, "A Tutorial on Hidden Markov Models and Selected Applications in Speech Recognition," Proceedings of the IEEE, 77(2), pp. 257-286, Feb. 1989.

Sarawagi and Cohen, "Semi-Markov Conditional Random Fields for Information Extraction," NIPS 2004: Advances in Neural Information Processing Systems, 8 pages, Dec. 2004.

Schutze and Singer, "Part-of-speech tagging using a variable memory markov model," Proceedings of the 32nd Annual Meeting on Association for Computational Linguistics, pp. 181-187, Las Cruces, NM, USA, 1994.

Spearman, "The Proof and Measurement of Association Between Two Things," 1904, in *The American Journal of Psychology* 100(3-4):441-471, 1987.

Sutton and McCallum, "An Introduction to Conditional Random Fields for Relational Learning," L. Getoor and B. Taskar, editors, Introduction to Statistical Relational Learning, MIT Press, 35 pages, 2006.

Sutton et al., "Dynamic Conditional Random Fields: Factorized Probabilistic Models for Labeling and Segmenting Sequence Data," *J. Mach. Learn. Res.* 8, pp. 693-723, Mar. 2007.

Tang and Mooney, "Using Multiple Clause Constructors in Inductive Logic Programming for Semantic Parsing," EMCL '01: Proceedings of the 12th European Conference on Machine Learning, LNCS 2167, pp. 466-477, Freiburg, Germany, Sep. 5-7, 2001.

Thompson et al., "Building Usable Menu-based Natural Language Interfaces to Databases," M. Schkolnick and C. Thanos, editors, VLDB, pp. 43-55, 1983.

Liu et al., "Recognizing Biomedical Named Entities Using Skip-chain Conditional Random Fields," Proceedings of the 2010 Workshop on Biomedical Natural Language Processing, ACL 2010, pp. 10-18, Uppsala, Sweden, Jul. 15, 2010.

Wallach, "Conditional Random Fields: An Introduction," Technical Report MS-CIS-04-21, University of Pennsylvania, 9 pages, Feb. 24, 2004.

* cited by examiner

FIG. 4
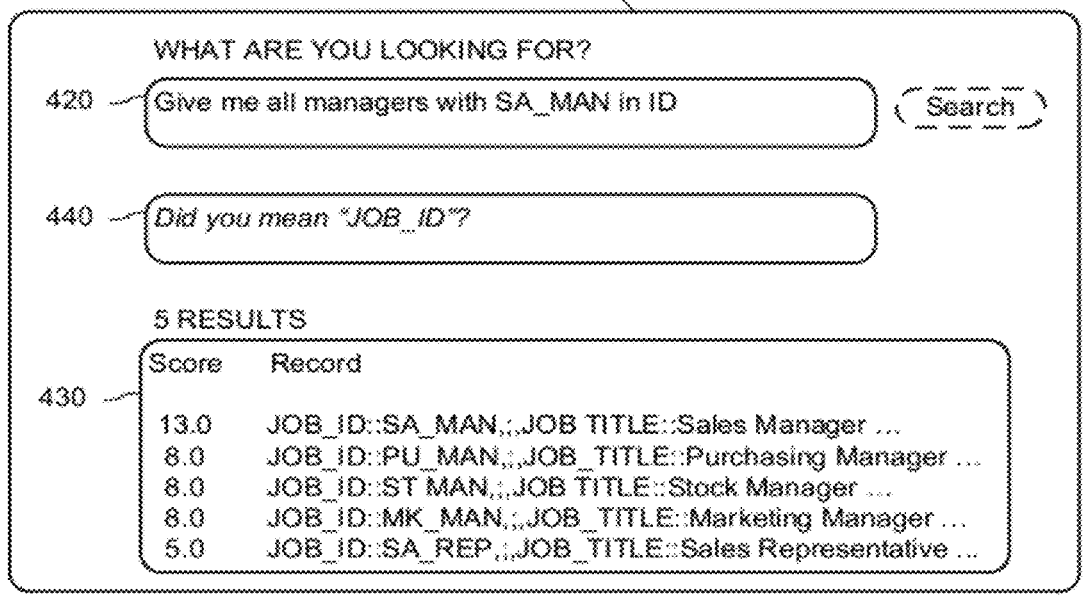
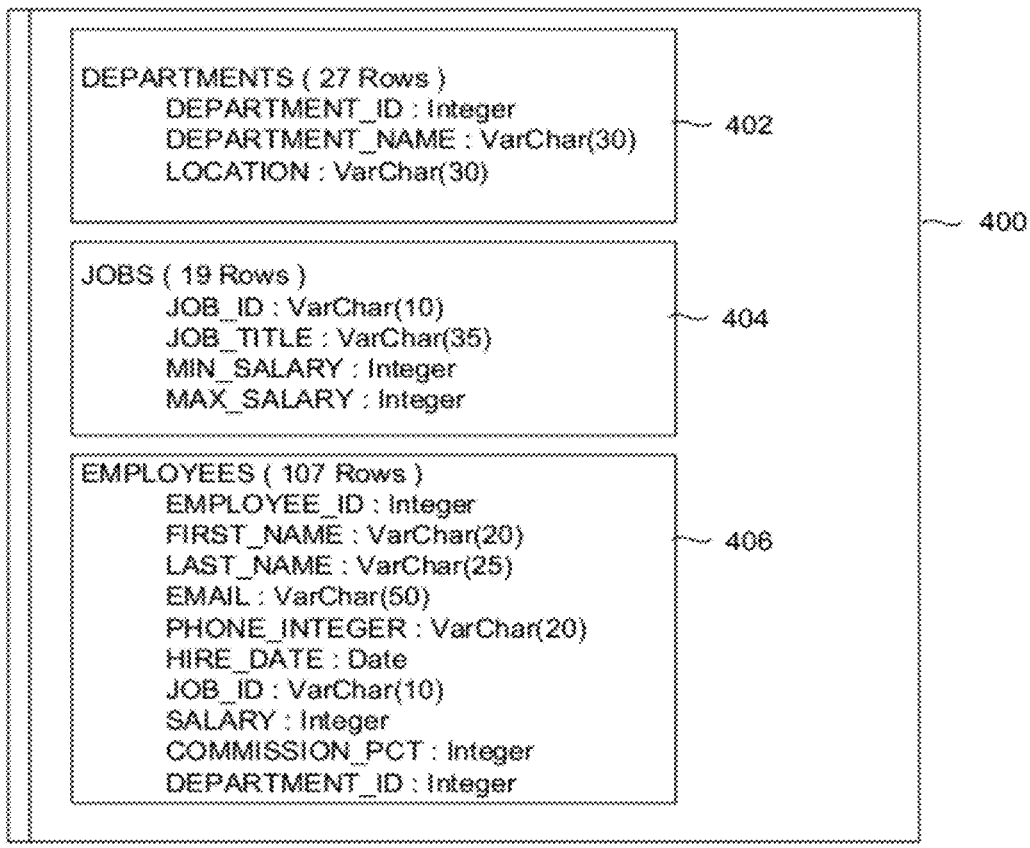

FIG. 10

$$P(y|x) = \frac{P(y,x)}{\sum_{\tilde{y}} P(\tilde{y},x)} \quad (1)$$

$$C = \{\Phi_t(y_t, y_{t-1}, x_t)\}_{t=1}^T \quad (2)$$

$$P(y|x) = \frac{1}{Z(x)} \prod_{(C_p \in C)} \prod_{(\Phi_c \in C_p)} \Phi_c(y_c, x_c; \theta_p) \quad (3)$$

$$\Phi_c(y_c, x_c; \theta_p) = \exp\left(\sum_{k=1}^K \lambda_k f_k(y_c, x_c)\right) \quad (4)$$

$$\Phi_c(y_{t_{ca}}, y_{t_{cb}}, x_c; \theta_p) = \exp\left(\sum_{k=1}^K \lambda_k f_k(y_{c,t_{ca}}, y_{c,t_{cb}}, x_c)\right) \quad (5)$$

$$P_1(y|x) = \frac{1}{Z(x)} \exp\left\{\sum_{k=1}^K \lambda_k f_k(y_t, y_{t-1}, x_t)\right\} \quad (6)$$

$$Z(x) = \sum_y \exp\left\{\sum_{k=1}^K \lambda_k f_k(y_t, y_{t-1}, x_t)\right\} \quad (7)$$

$$P_2(y|x) = \frac{1}{Z(x)} \prod_{t=1}^T \Phi_t(y_t, y_{t-1}, x) \times \prod_{(u,v) \in I} \Phi_{uv}(y_u, y_v, x) \quad (8)$$

$$\Phi_t(y_t, y_t - 1, x) = \exp\left\{\sum_k \lambda_{1k} f_{1k}(y_t, y_t - 1, x, t)\right\} \quad (9)$$

$$\Phi_{uv}(y_u, y_v, x) = \exp\left\{\sum_k \lambda_{2k} f_{2k}(y_u, y_v, x, u, v)\right\} \quad (10)$$

$$P(y|x) = P_1(y|x) \times P_2(y|x) \quad (11)$$

$$Score_i = W_{s1} + W_{s2} + IndexerScore_i \quad (12)$$

$$accuracy = \prod_{x_i \in \{x\}} P(y|x_i) \times \frac{J(\hat{x}_i, T)}{\sum_{t \in T} J(t, T)} \quad (13)$$

FIG. 11

```
Require: User query x, weights given to CRF output tags w_s1 and w_s2, penalty score
    γ
Ensure: Weight vector W.
 1: y_CrfS1 = LabelInstance_CrfS1(x)
    {Find label sequence from CrfS1}
 2: f_CrfS1ColVal = Σ_{y_i∈y} δ_{y_i}(C=Val)
 3: f_CrfS1ColName = Σ_{y_i∈y} δ_{y_i}(C=Name)
 4: if f_CrfS1ColVal > 0 AND f_CrfS1ColName > 0 then
 5:     W_S1 = w_s1 × ( (f_CrfS1ColName + f_CrfS1ColVal) / 2 )
 6:     x̄ = [x y_CrfS1]
        {Augment Input Feature Vector with Labels from CrfS1}
 7:     y_CrfS2 = LabelInstance_CrfS2(x̄)
        {Find label sequence from CrfS2}
 8:     f_CrfS2Start = Σ_{y_i∈y_CrfS2} δ_{y_i}(s=start)
 9:     if f_CrfS2Start > 0 then
10:         W_S2 = w_s2 × f_CrfS2Start
11:     end if
12: else if f_CrfS1ColVal > 0 then
13:     W_S1 = (w_s1 × f_CrfS1ColVal) − γ
        {Penalize x if there is no ColName entity
        }
14: end if
15: return [W_S1 W_S2]
```

FIG. 12

```
Require: User query x, DB meta data DBMeta, Initial Weights W, OfS1 labels
         y_{C1/S1}, OfS2 labels y_{C2/S2}.
Ensure: Ordered search results
 1: W = ComputeWeightVector(x)
    // For more details on ComputeWeightVector, refer Algorithm 1
 2: x̂ = ConstructSearchQuery(x, y_{C2/S2})
    // Construct search query for index
 3: SearchHits = SearchIndex(x̂)
    // Search database content index using x̂
 4: for all Hit_i ∈ SearchHits do
 5:     SimScore_{C1/S1} = Sim(y_{C1/S1}, y_{C2/S2}, Hit_i)
        // Find similarity of hits with ColVal entities detected using OfS1
 6:     SimScore_{C2/S2} = PairedSim(y_{C2/S2}, Hit_i)
        // Find similarity of hits with Start and End entity pairs detected using OfS2
 7:     if SimScore_{C2/S2} > τ_{C2/S2} then
 8:         IncrementScore(Scores_{Hit_i}, W_{S2})
            // Reward hits with score W_{S2}
 9:     else if SimScore_{C1/S1} > τ_{C1/S1} then
10:         IncrementScore(Scores_{Hit_i}, W_{S1})
            // Reward hits with score W_{S1}
11:     end if
12: end for
13: SortedScores = SortScores(Scores)
    // Sort the scores available for each hit
14: return SortedScores
```

NATURAL LANGUAGE QUERYING WITH CASCADED CONDITIONAL RANDOM FIELDS

BACKGROUND

Databases are useful for storing, retrieving, and organizing large amounts of information. However, database queries are typically required to be compliant with particular rules specified by the underlying database. Such requirements pose challenges to widespread adoption of database technology, especially where specialized training is required to allow ordinary users to use a database. Natural language queries are sometimes used to attempt to bridge the communication gap between users and databases.

SUMMARY

Disclosed herein are representative embodiments of methods, apparatus, and systems for querying databases with natural language sentences using cascaded conditional random fields (CRFs). The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any specific advantage be present or problem be solved.

In examples described herein, a natural language query tool comprising cascaded CRFs (e.g., a linear-chain CRF and a skip-chain CRF applied sequentially) processes natural language input to produce output that can be used in database searches. For example, cascaded CRFs extract entities from natural language input that correspond to column names or column values in a database, and identify relationships between the extracted entities. The natural language query tool can then form a search string based on entity information (e.g., column value information). A database query can then be executed (e.g., by a search engine). For example, a search engine can execute a query based on a search string over an inverted index of a database, which can be based on one or more materialized views of the database. When results are received, the results can be sorted (e.g., according to relevance scores) and presented in a user interface, potentially along with other information (such as suggestions for corrections or modifications to a natural language query). Described tools and techniques can be used in a wide variety of applications to provide a natural language interface for extracting data from databases.

The foregoing and other objects, features, and advantages will become more apparent from the following detailed description, which proceeds with reference to the accompanying figures.

BRIEF DESCRIPTION OF THE DRAWINGS

FIG. 4 is a diagram of an exemplary user interface with exemplary query results that can be obtained by a system implementing technology described herein.

FIG. 10 shows equations that describe aspects of some natural language query processing embodiments described herein.

FIG. 11 and FIG. 12 show exemplary techniques that can be performed by some natural language query processing embodiments described herein.

DETAILED DESCRIPTION

Figure 1:
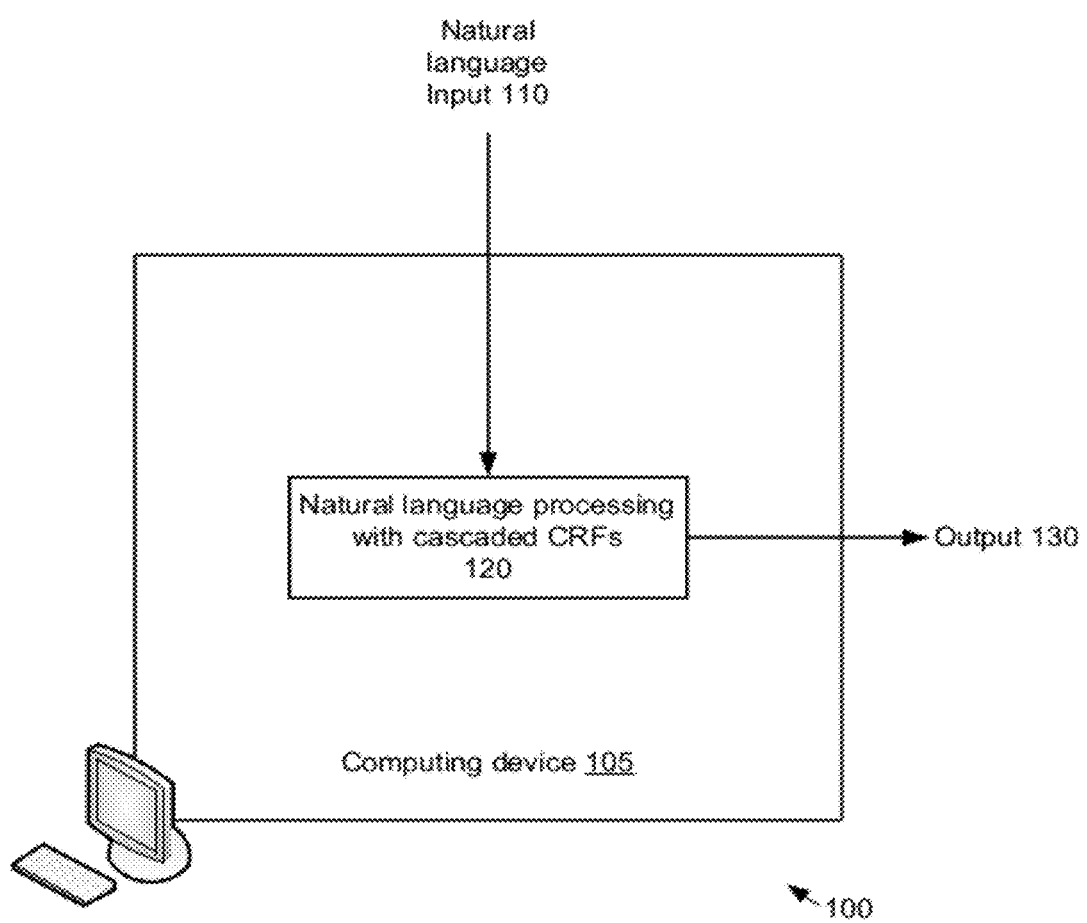
FIG. 1 is a block diagram of an exemplary system implementing technology described herein.

Techniques and tools for retrieving information from data sources via natural language queries are described. For example, embodiments of described natural language query tools use multi-level conditional random fields (CRFs), referred to as cascaded CRFs. CRFs provide a probabilistic framework for labeling and segmenting sequential data, such as natural language text. In described examples, a first-level CRF is trained to identify (or extract) entities based on keywords or phrases in natural language input, such as sentences. A second-level CRF finds relationships among entities extracted in the first-level CRF. Unlike traditional CRFs, described cascaded CRFs can identify semantic relationships between entities to allow efficient labeling of natural language queries and provide high-quality search results.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. Furthermore, any features or aspects of the disclosed embodiments can be used in various combinations and subcombinations with one another. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems.

The disclosed methods can be implemented using computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives)) and executed on a computer (e.g., any commercially available computer or a computer embedded in a device, such as a laptop computer, desktop computer, net book, web book, tablet computing device, smart phone, or other mobile computing device). Any of the intermediate or final data created and used during implementation of the disclosed methods or systems can also be stored on one or more computer-readable media (e.g., non-transitory computer-readable media) and are considered to be within the scope of this disclosure.

For clarity, only certain selected aspects of the software-based embodiments are described. Other details that are well known in the art are omitted. For example, it should be understood that the software-based embodiments are not limited to any specific computer language or program. Likewise, embodiments of the disclosed technology are not limited to any particular computer or type of hardware. Exemplary computing environments suitable for performing any of the disclosed software-based methods are introduced below.

The disclosed methods can also be implemented using specialized computing hardware that is configured to perform any of the disclosed methods. For example, the disclosed methods can be implemented by an integrated circuit (e.g., an application specific integrated circuit (ASIC), or programmable logic device (PLD), such as a field programmable gate array (FPGA)) specially designed to implement any of the disclosed methods (e.g., dedicated hardware configured to perform any of the disclosed embodiments).

I. Introduction

Natural language search problems involve determining a set of labels to answer a query efficiently for a given set of search terms or keywords provided as input. The approaches to natural language search problems can be broadly classified as template-based approaches, rule/grammar-based approaches, and machine learning approaches.

Template-based approaches typically aim to transform template elements into corresponding functional elements in a formal query language. In a typical template-based approach, a user interface (e.g., a menu-driven "wizard" or other user interface) prompts a user to enter information for required fields and progressively builds a corresponding query in a formal query language (e.g., SQL, sometimes referred to as Structured Query Language). However, such interfaces can become too cumbersome for large scale systems with a large grammar size and high complexity.

Rule-based approaches range from word-based regular expressions to complex grammars which use part-of-speech (POS) tagging to form rules. Queries can be directed to a particular domain or application, such as a geographic information system (GIS), or to more general database tables. In a rule-based approach that uses POS tagging, precise meanings of natural language sentences and phrases can be difficult to discern. For example, adjectives used in phrasing a sentence can be subjective (e.g., "smart worker," "good shoes," "costly decorations"). To allow meaningful inferences, such terms can be explicitly defined by a user and complex rules can be developed to help a system understand their meaning, but such efforts can add significant time and cost.

Grammar-based approaches are largely rules-driven. A given user's query typically is matched against a predefined set of rules, and search keywords can be translated to equivalent SQL queries based on the set of rules. But, as the language style or construct changes, it can become increasingly challenging to maintain the rules in a grammar-based approach. In addition, query translation becomes computationally expensive when evaluation is carried out over a larger set of rules.

A direct application of such approaches leads to a number of issues. It is difficult to capture semantic relationships hidden in search keywords, leading to reduced accuracy of search results. Search terms tend to be treated independently and given equal weight without considering functional dependencies that may exist between keywords. Rich sources of metadata available in the form of data constraints and data relationships are often disregarded. Additionally, such approaches tend to focus on simple query types (e.g., "retrieve records of people whose job title has president in it"; "show records with job titles for clerk and programmer"). However, in a typical enterprise scenario, the queries can be more complex in nature. The natural language queries in an enterprise can include range queries ("give all records with max salary above $20000"), logical queries, queries with more than one type (e.g., range-logical queries such as "display records with job title as accountant AND min salary equal to $8200"), or other types of queries. Furthermore, names assigned to tables in a database may intentionally or unintentionally coincide with those given to columns in the same table or other tables. Therefore, many tools that use lexicon look-up (mainly used in rule-based approaches) fail to distinguish between column names, table names, and table contents (or values).

Machine learning approaches learn patterns from training data and can be useful in predicting data patterns, including previously unknown patterns that template-based and rules-based approaches might not be able to discover. Some statistical and machine learning natural language search techniques include statistical inference, semantic classification trees, inductive logic programming, variable Markov models and maximum entropy Markov models.

Some graph-based approaches consider all keywords in an input query and search for a closely connected set of nodes in a database that matches all keywords in the query. However, many machine learning approaches fail to consider database metadata, and fail to discover relationships among entities in a database to be searched.

II. Natural Language Query Tools with CRF-Based Machine Learning Models

A. Overview

Exemplary natural language query tools with conditional random field (CRF) based machine learning models are described in this section.

A CRF is a graph-based machine learning model in which hidden entities or states can be discovered using a set of observed states. For example, in the natural language search domain, observed states can be keywords, and hidden states to be discovered can be represented with tags such as part-of-speech (POS) tags, noun phrase tags, or other domain-specific tags. CRFs can use conditional probabilities to label output sequences from a given set of input (e.g., a sequence of keywords). CRF approaches can produce more accurate search results compared to, for example, Markov models.

Exemplary natural language query tools use cascaded CRFs (e.g., two CRFs applied sequentially) to extract entities from input natural language queries and accurately determine relationships between the extracted entities. As used herein, "natural language query" refers to any natural language input, such as a questions or sentence, that can be used to perform a query on a data source. As used herein, "entity" refers to a term that can be extracted and labeled (e.g., with a column name label or a column value label) in a natural language query. As used herein, "column" refers to a set of data values (individually referred to as "column values") of a particular type in a database table, where each column value is associated with a database record (or "row"). "Columns" and "rows" are not restricted to any particular orientation. For example, a column or row can be presented in a horizontal orientation, a vertical orientation, or some other orientation when displayed to a user. "Column name" refers to an identifier for a column. As used herein, "column name label" and column value label" refer to labels or tags that identify terms as potentially being a match (e.g., an exact match or an approximate match) for actual column names or column values, respectively, in a database. As used herein, "term" in the context of natural language queries refers to words or other elements in the natural language queries.

A first-level CRF in a series of cascaded CRFs can extract entities of interest from terms in natural language input (e.g., text input generated by a user via a user interface, speech input, or some other form of natural language input), and a second-level CRF can disambiguate meaning by identifying relationships which may exist between the entities extracted by the first-level CRF. More CRFs can be added to capture more complex relationships. Text indexing techniques and database constraints can be used to identify hidden semantic relationships present in the data. Result scoring schemes can be used to provide high quality search results.

Embodiments of the described natural language query tools can be used when querying structured data sources (e.g., relational databases, XML data sources, CSV data sources, or other structured data sources). For example, some embodiments of the described natural language query tools can be used to query structured data sources available over the Internet, such as databases associated with forms on web pages, HTML tables on web pages, web services, photo-sharing and video-sharing sites, collaborative annotation services (e.g., services that allow users to annotate web pages and share their annotations), or other data repositories. Some embodiments of the described natural language query tools also can be used when querying unstructured data sources.

Some embodiments of the described natural language query tools provide advantages over systems that simply convert natural language queries to SQL statements. For example, some embodiments of the described natural language query tools can identify semantic relationships that implicitly exist in natural language queries, allowing such tools to distinguish between same-valued or similarly-valued terms in a query that could represent values for entities in more than one place (e.g., in multiple columns of a table, or in multiple tables) in a database.

In contrast to template-based approaches, where users select options and specify parameters to build a database query, embodiments of the described natural language query tools allow free-form query input and do not require knowledge of underlying databases or query languages, allowing queries on data sources whose characteristics (e.g., metadata, schema) are not completely known or are subject to change. Embodiments of the described natural language query tools can be useful for applications such as querying dynamic web-based databases, in which tables are frequently added, modified, or deleted. Embodiments of the described natural language query tools also can provide a fast search interface for more static databases that are not updated as frequently. Embodiments of the described natural language query tools can be used in place of template-based systems in e-commerce applications that convert input into SQL statements, where changes to input fields or addition of new input fields would require changes to the e-commerce application. Embodiments of the described natural language query tools can omit translation into SQL queries with the use of inverted indexes. Inverted indexes can be used, for example, to list database records associated with different entities for fast retrieval. Embodiments of the described natural language query tools can be used in a data federation system that integrates multiple data systems into a federated database.

Embodiments of the described natural language query tools can be used by a variety of enterprises, such as e-commerce project developers, database vendors, web service providers, search engine providers, or text analytics tool providers. Described CRF-based machine learning models can be applied to several application scenarios (e.g., semantic search engines, geographic information system (GIS) applications, or human resources (HR) applications) to provide a natural language interface for extracting information using free-form text from large databases. Embodiments of the described natural language query tools can be used by users that wish to access data from a data source but have not been trained in a formal query language. For example, embodiments of the described natural language query tools can be used in a solution-finder for automotive problems hosted by an automotive company, an online sentiment-finder for products that customers are reviewing through context-based search engines, an interface at an automated information kiosk where users type or speak questions in free form, or a patent landscape analysis tool in which users enter short sentences that represent a problem statement.

CRFs in described CRF-based learning models can be trained to learn the process of extraction of entities from natural language input and identify relationships between entities, and can be adapted to changes in querying patterns by retraining the classifiers (e.g., with updated training data). Described CRF-based machine learning models use cascaded CRFs, which can learn sequential patterns and allow capturing of semantics which are inherent in a query (e.g., automatically) based on patterns learned during training.

Embodiments of the described natural language query tools can enable faster retrieval of results. For example, embodiments of the described natural language query tools can reduce search query retrieval time by using value-based indexing, which can be used to produce inverted indexes. As another example, a materialized view can help provide faster responses for frequently used queries. Materialized views are tools used in some database management systems, in which query results from a main database are cached in separate tables for later retrieval.

Described CRF-based machine learning models can be used in embodiments of the described natural language query tools to identify patterns in different types of queries, such as simple keyword matching queries, or more complex queries such as join queries, aggregate queries, range queries, range-join queries, or range-aggregate queries.

Embodiments of the described natural language query tools can provide qualified answers, which can be beneficial in situations such as approximate searching, where there is ambiguity or only partial information with respect to search criteria. Responses can be presented in ranked form using a scoring function. The scoring function can take into account factors such as keyword similarities and relationships extracted by CRFs. To support terms in natural language queries that do not exactly match with actual table and column names, embodiments of the described natural language query tools can use semantic similarity techniques (e.g., using synonyms, hypernyms, or hyponyms) to find matches and/or relations that exist among the terms.

B. Exemplary Systems

FIG. 1 is a block diagram of an exemplary system 100 implementing technologies described herein. In the example, a computing device 105 implements a natural language processing component with cascaded CRFs 120. Computing device 105 receives (e.g., via a user interface) natural language input 110. For example, natural language input 110 comprises free-form text input in the form of a question or statement. Alternatively, natural language input 110 comprises audio input (e.g., speech input) or some other form of natural language input. Computing device 105 processes natural language input 110 in the natural language processing component with cascaded CRFs 120, and produces output 130. Output 130 can include, for example, a database query that can be sent to a database stored on one or more other computing devices (not shown) for processing. Alternatively, processing of database queries can be performed by computing device 105, such as when a database being queried is stored on computing device 105. As another example, output 130 can include display of ordered search results obtained in response to a database query.

Figure 2:
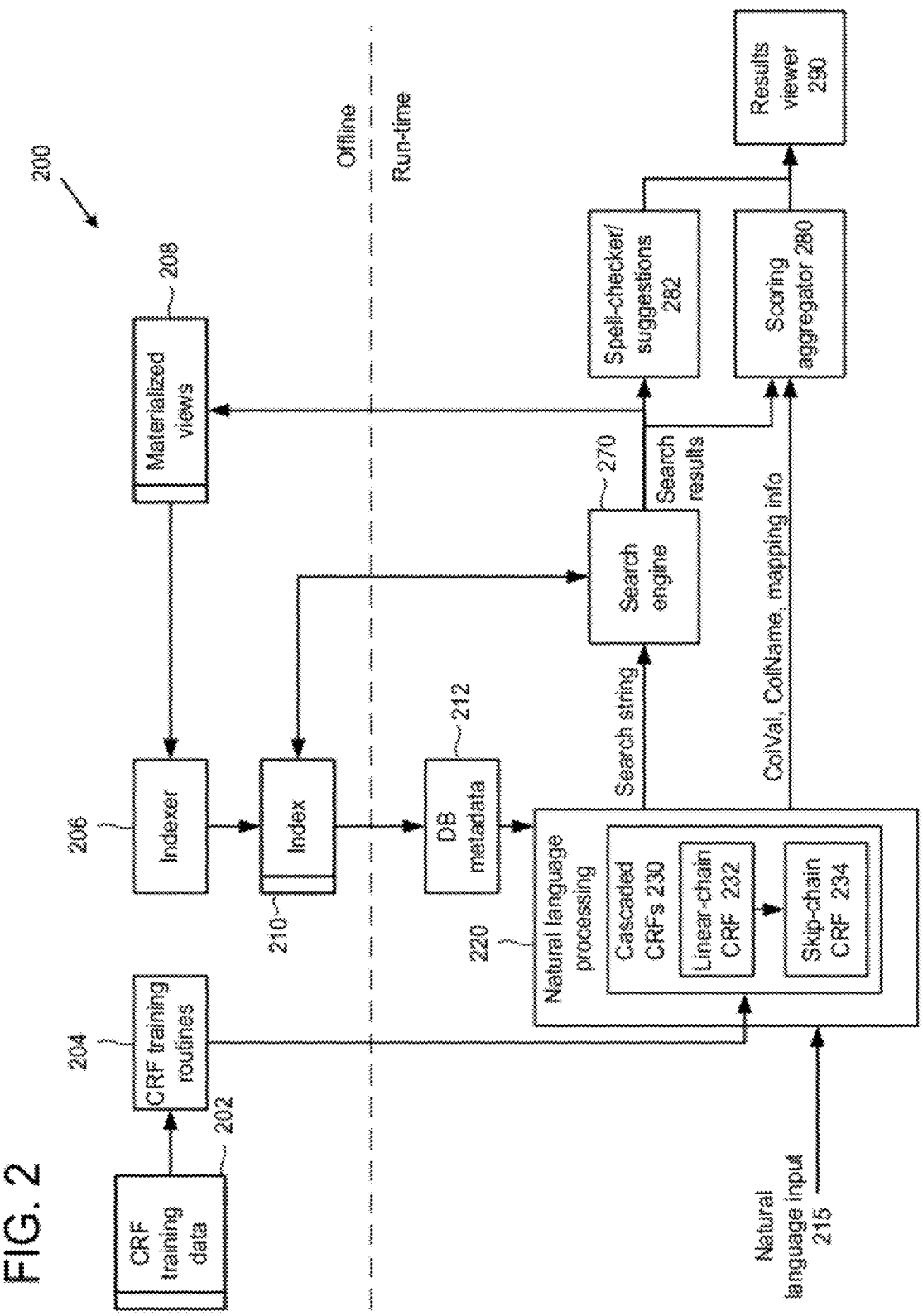
FIG. 2 is a block diagram of a detailed exemplary system implementing technology described herein.

FIG. 2 is a detailed block diagram of an exemplary system 200 implementing technologies described herein. The components shown in FIG. 2 can be implemented on a single computing device, or on multiple computing devices. In FIG. 2, exemplary system 200 is shown with offline and runtime features. "Offline" refers to activities that are performed prior to processing of natural language queries, and "runtime" refers to activities that are performed during processing of natural language queries. Alternatively, activities described as being offline activities can be performed during processing of natural language queries, or activities described as being runtime activities can be performed before or after processing of natural language queries.

In the example shown in FIG. 2, as an offline activity, CRF training data 202 are used by CRF training routines 204 to train cascaded CRFs 230 in a natural language processing component 220. Cascaded CRFs 230 comprise a linear-chain CRF 232 that is used to extract entity information (e.g., possible column names and column values) from natural language input 215, and a skip-chain CRF 234 that is used to extract relationship information (e.g., mapping information that connects entities extracted by linear-chain CRF 232).

CRF training routines 204 can be used to train linear-chain CRF 232 and skip-chain CRF 234 on a training dataset having entity labels and relationship labels (e.g., with relationship labels hidden while training the entity-extracting machine learning model, and with entity labels hidden while training the relationship-extracting machine learning model). CRFs can be trained on the same training data set in a pipeline manner, thus reducing overall training data size.

Once trained, as a runtime activity, natural language processing component 220 receives (e.g., via a user interface designed to accept natural language input from a user) and processes natural language input 215. In particular, natural language input 215 is processed by linear-chain CRF 232 to identify likely column names (ColName) and column values (ColVal). Skip-chain CRF 234 generates mapping information that maps ColName and ColVal nodes together as a skip edge. As used herein, "skip edge" refers to an edge in a graph generated by a skip-chain CRF. As used herein, "graph" refers to a data structure comprising nodes that are linked by edges (e.g., skip edges), indicating a pair-wise relationship between the nodes. Mapping information generated by skip-chain CRF 234 can include, for example, Start and End labels, Source and Target labels, or some other form of mapping information.

In the example shown in FIG. 2, as an offline activity an indexer 206 performs an indexing technique on materialized views 208 of a database to be searched, which produces an index 210 (e.g., an inverted index). Materialized views 208 include cached results from prior searches, and can be used to allow faster retrieval of results (e.g., for frequently searched queries). A database can be indexed using any suitable indexer, which may also provide a search interface (e.g., a programmatic interface) for the content that is indexed. For example, the indexer 206 can include a database crawler that scans each record in a database, as well as an inverted index generator that generates a search index.

Database metadata 212 includes information from the database to be searched (e.g., table names, column names, and/or column values). As a runtime activity, database metadata 212 can be used by natural language processing component 220 to form a database query (e.g., in the form of a search string). For example, natural language processing component 220 can compare database metadata 212 with output from cascaded CRFs 230 (e.g., ColName and ColVal labels) to form a database query. Database metadata 212 also can be used for other purposes, such as to refine identification of likely column names or column values in natural language input 215.

As a runtime activity, a search engine 270 can accept a search string from natural language processing component 220 and execute a search over index 210. For example, search engine 270 can retrieve matching results (e.g., database records) based on keywords in the search string. Materialized views 208 can be updated with records retrieved in response to searches. Search engine 270 also can assign a default score (e.g., a percentage, an integer, or some other numeric or non-numeric indicator of relevance) for the respective results. The search results and default scores (if any) are sent to scoring aggregator 280, which consolidates the search results (e.g., for presentation to a user) and assigns scores or adjusts scores if default scores are provided. For example, the scoring aggregator can include a score retriever that obtains the default scores for the respective search results, and a score crediting system that gives additional credit to search results that match the entities or relationships extracted by the CRFs and provides varying weight to the nature of the matches (e.g., providing full weight to full-word matches, and less weight to approximate matches as measured by functions such as edit distance, longest common substring, WordNet matching, or stemmed matching). Suggestions and spell-checking can be performed in spell-checker/suggestion component 282. For example, spell-checker/suggestion component 282 can use the Metaphone phonetic algorithm to suggest similar sounding, alternative words, and can use correlation matrix memories (CMM) for distance-based comparison of terms.

In the example shown in FIG. 2, as a runtime activity, search results are presented in results viewer 290. For example, results viewer 290 can present sorted, qualified results (e.g., sorted by relevance). For sorting purposes, result viewer 290 can include a results sorter that sorts qualified results (e.g., in descending order of relevance) according to scores obtained from the scoring aggregator. Alternatively, results can be unsorted, or can be sorted at some other location in the system (e.g., in scoring aggregator 280).

Figure 3:
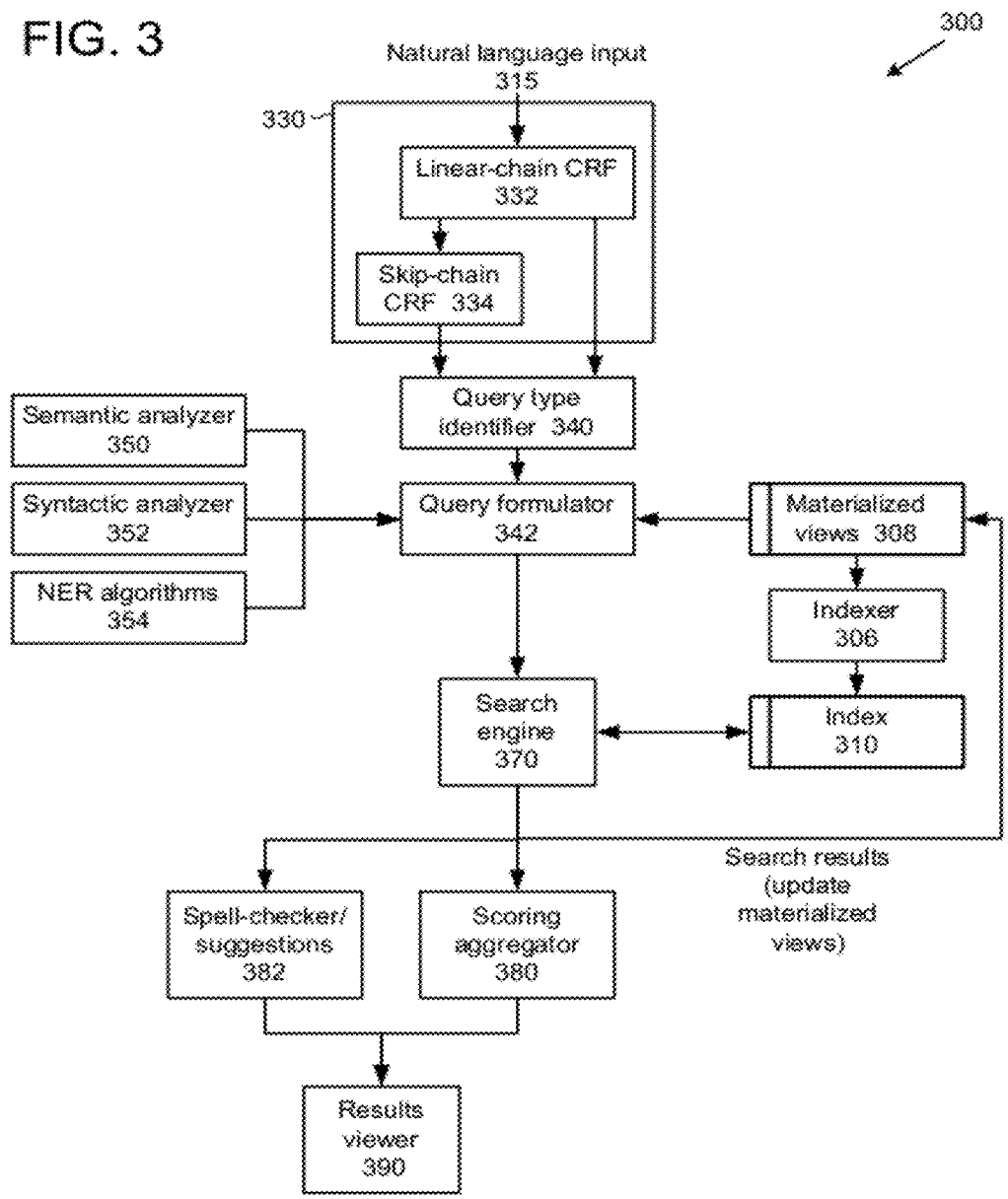
FIG. 3 is a block diagram of a detailed exemplary system implementing technology described herein.

FIG. 3 is a detailed block diagram of an exemplary system 300 implementing technologies described herein. The components shown in FIG. 3 can be implemented on a single computing device, or on multiple computing devices.

In the example shown in FIG. 3, a linear-chain CRF 332 in cascaded CRFs 330 is used to extract entity information from natural language input 315, and a skip-chain CRF 334 is used to extract relationship information (e.g., mapping information that connects entities extracted by linear-chain CRF 332). For example, parts of speech (POS) tags are assigned to natural language input 315 by a POS tagger (not shown), which is then processed by linear-chain CRF 332 to identify likely column names (e.g., using ColName labels) and column values (e.g., using ColVal labels). POS tags can be useful given the observation that column names and column values are often nouns. Skip-chain CRF 334 generates mapping information that maps ColName and ColVal nodes together as a skip edge. Mapping information generated by skip-chain CRF 334 can include, for example, Start and End labels, Source and Target labels, or some other form of mapping information. The system 300 uses the output from linear-chain CRF 332 and skip-chain CRF 334 to determine a query type (e.g., range query, logical query, etc.) in a query type identifier 340. For example, query type identifier 340 uses heuristics to determine query type. Such heuristics can involve, for example, looking for words or phrases in natural language input 315 that indicate a range query or a logical query.

In the example shown in FIG. 3, query formulator 342 formulates a query to be performed on a database. In addition to information relating to query type, extracted entity information, and extracted mapping information, query formulator can use semantic analyzer 350, syntactic analyzer 352, and named entity recognition (NER) algorithms 354 to process the natural language input and formulate a query. Database metadata from materialized views 308 can be used by query formulator 342 to formulate the query. For example, natural language processing component query formulator 342 can compare database metadata with output from cascaded CRFs 330 (e.g., ColName and ColVal labels) to formulate a query. Alternatively, the natural language input 315 can be processed to formulate a query in some other way.

In the example shown in FIG. 3, a search engine 370 can accept a formulated query as input and execute a search over index 310 (e.g., an inverted index) created by indexer 306 based on materialized views 308. For example, search engine 370 can retrieve matching results (e.g., database records) based on keywords in the query. Materialized views 308 can be updated with records retrieved in response to searches. Search engine 370 also can assign a default score (e.g., a percentage, an integer, or some other numeric or non-numeric indicator of relevance) for the respective search results. The search results and default scores (if any) are sent to scoring aggregator 380, which consolidates the search results (e.g., for presentation to a user). For example, the scoring aggregator can include a score retriever that obtains the default scores for the respective search results, and a score crediting system that gives additional credit to search results that satisfy relationships described by the mapping information. Suggestions and spell-checking can be performed in spell-checker/suggestion component 382.

In the example shown in FIG. 3, search results are presented in results viewer 390. For example, results viewer 390 can present sorted, qualified results. Results viewer 390 can include a results sorter that sorts qualified results (e.g., in descending order of relevance) according to scores obtained from the scoring aggregator 380. Alternatively, results can be unsorted, sorted in some other way, or sorted at some other location in the system (e.g., in scoring aggregator 380).

In practice, exemplary systems described herein such as systems 100, 200 and 300 can include additional system components, additional relationships between system components, and the like. The relationships shown between modules within exemplary systems described herein such as system 100 indicate general flows of information in the respective system; other relationships are not shown for the sake of simplicity. Depending on the implementation and the type of processing desired, modules of the system can be added, omitted, split into multiple modules, combined with other modules, and/or replaced with like modules. Generally, the technologies described herein are generic to different operating systems or hardware and can be applied in any variety of environments to take advantage of the described features.

C. Exemplary User Interface with Query Results

This section describes exemplary approaches to user interaction. Any of the described approaches can be used in a natural language query processing system, such as system 100, 200 or 300. FIG. 4 shows an exemplary graphical user interface (GUI) 410 that can be used to enter a natural language query and receive ordered search results from a database 400 which has three tables 402, 404, 406. GUI 410 includes a query area 420 for entering a natural language query and a results area 430 in which ordered search results are shown, in descending order of relevance scores. Results area 430 includes 5 records from table 404 ("JOBS"). In the example shown in FIG. 4, the query shown in query area 420 is "Give me all managers with SA_MAN in ID." A suggestions area 440 provides feedback on the query. In the example shown in FIG. 4, the suggestion area 440 includes a suggestion that the user might have been looking for information about "JOB_ID" because, while the string "ID" does not match any column names in tables 402, 404, 406, there is a column called "JOB_ID" in each record in the search results. Alternatively, a user interface can have more or fewer features, or different combinations of features.

D. Exemplary Techniques

Figure 5:
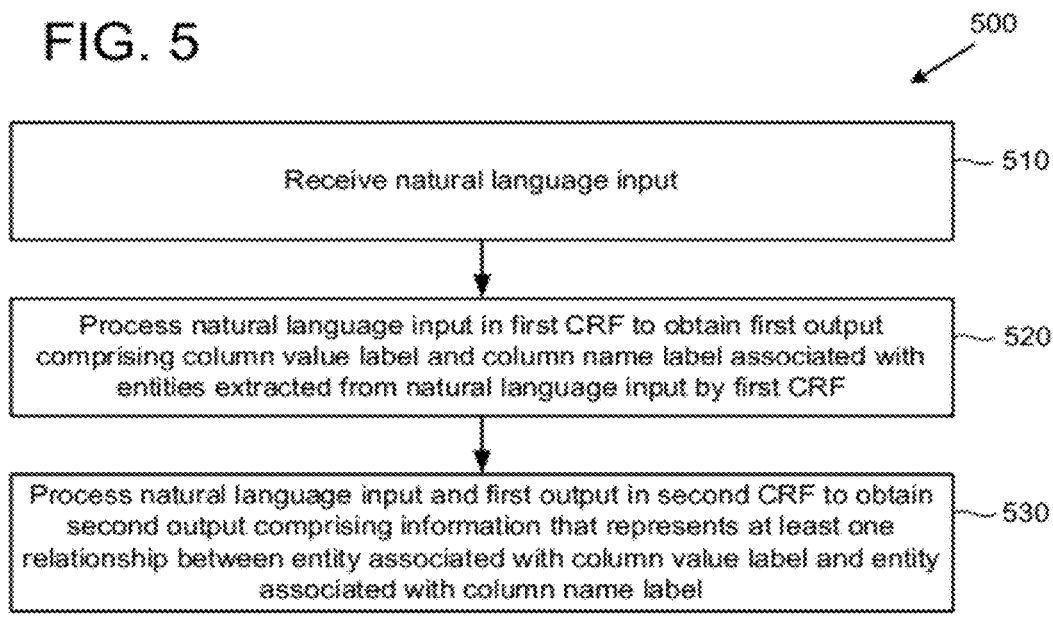
FIG. 5, FIG. 6 and FIG. 7 are flowcharts of exemplary techniques for processing natural language input with cascaded conditional random fields.

FIG. 5 shows an exemplary technique 500 for processing natural language input with cascaded CRFs. A system such as the system 100 shown in FIG. 1, the system 200 shown in FIG. 2, the system 300 shown in FIG. 3, or other system can perform the technique 500.

At 510, the system receives natural language input. For example, the system receives natural language text input from a user via a user interface. Alternatively, the system receives other natural language input, or receives the input in some other way. For example, natural language input can be received in the form of text sentences from a document, where the text sentences are used as a natural language query. At 520, the system processes the natural language input in a first CRF (e.g., a linear-chain CRF) to obtain a first output comprising a column value label and a column name label associated with entities extracted from terms in the natural language input. For example, the system extracts (or identifies) a first entity and a second entity from the natural language input, labels the first entity as a column value, and labels the second entity as a column name. At 530, the system processes the natural language input and the first output in a second CRF (e.g., a skip-chain CRF) to obtain second output comprising information that represents at least one relationship between the entity associated with the column value label and the entity associated with the column name label. The extracted entity associated with the column name label can correspond to (either exactly or approximately) a column in a database table, and the extracted entity associated with the column value label can correspond to (either exactly or approximately) a value in a column of the database table. The relationship can be represented as an edge between two nodes (e.g., a node associated with the column name label, and a node associated with the column value label) in a graph data structure. The information that represents the relationship can include a tag associated with one of the two nodes and a tag associated the other of the two nodes. Where the second CRF is a skip-chain CRF, the edge can be a skip-edge. Alternatively, processing of natural language input with the CRFs can result in other output (e.g., information other than column name labels and column values, such as table name information or other information relevant to a particular database).

Figure 6:
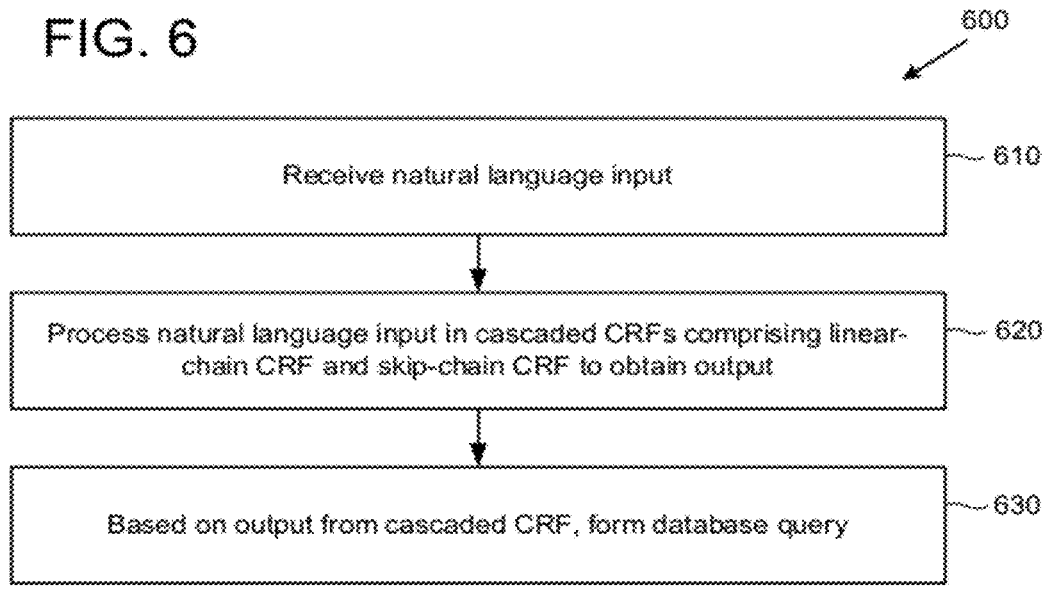

FIG. 6 shows another exemplary technique 600 for processing natural language input with cascaded CRFs. A system such as the system 100 shown in FIG. 1, the system 200 shown in FIG. 2, the system 300 shown in FIG. 3, or other system can perform the technique 600.

At 610, the system receives natural language input. At 620, the system processes the natural language input using cascaded CRFs comprising a linear-chain CRF and a skip-chain CRF. For example, the cascaded CRFs produce output comprising entity information (e.g., column value labels, column name labels, or other entity information) and relationship information (e.g., "Start" tags, "End" tags, or other relationship information). At 630, the system forms a database query based on the output from the cascaded CRF. For example, the system forms a search string based at least on the entity information. The database query can then be executed (e.g., by a search engine). For example, a search engine executes the query over an inverted index of a database, which can be based on one or more materialized views of the database. When results are received, the results can be sorted (e.g., according to relevance scores) and presented in a user interface, potentially along with other information (such as suggestions for corrections to a user's natural language query).

Figure 7:
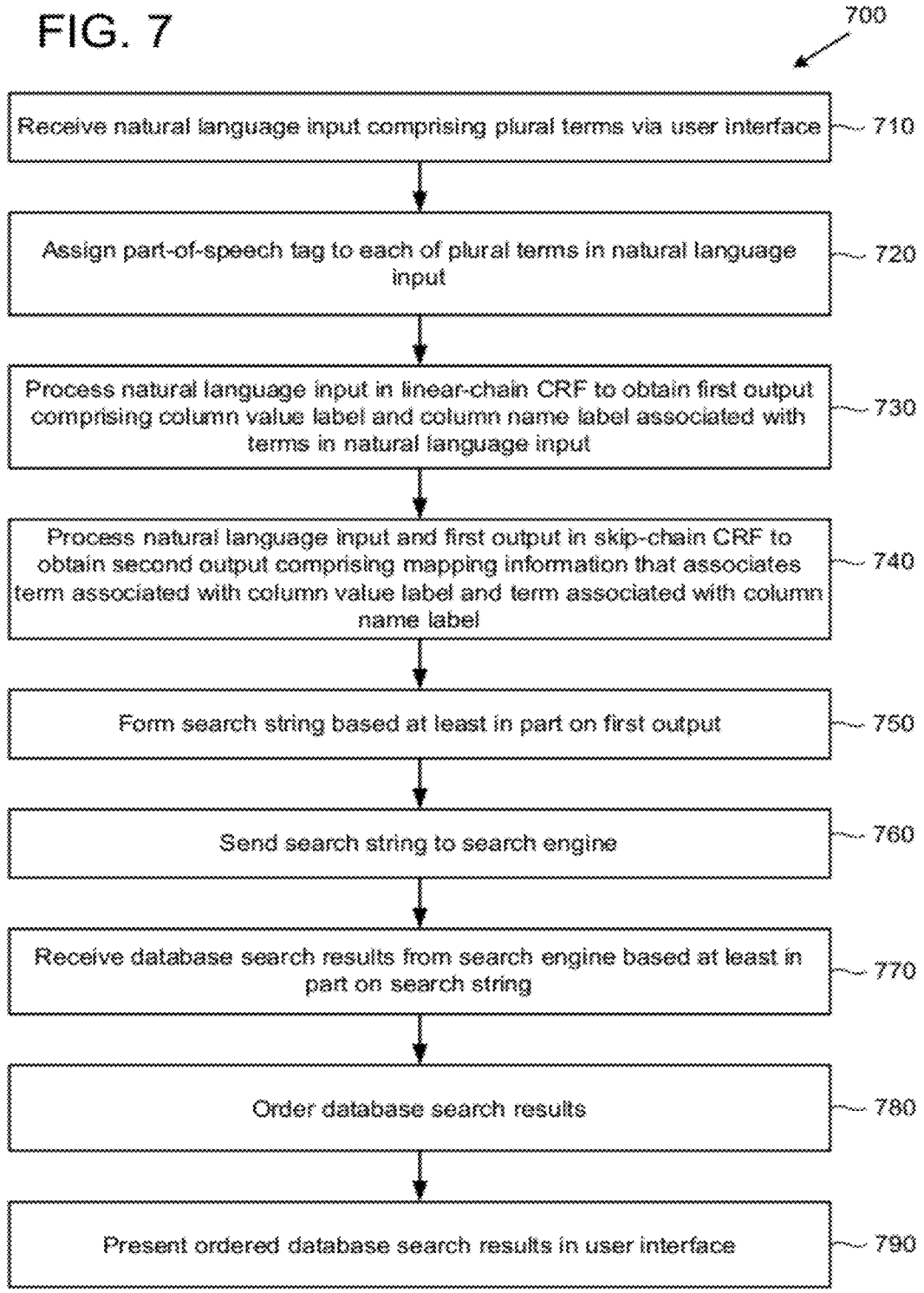

FIG. 7 shows another exemplary technique 700 for processing natural language input with cascaded CRFs. A system such as the system 100 shown in FIG. 1, the system 200 shown in FIG. 200, the system 300 shown in FIG. 3, or other system can perform the technique 700.

At 710, the system receives natural language input comprising plural terms via a user interface (e.g., a graphical user interface such as user interface 410 in FIG. 4). At 720, the system assigns a part-of-speech tag to each of plural terms in natural language input. For example, the system tags nouns in the natural language input with noun tags. At 730, the system processes the natural language input in a linear-chain CRF to obtain a first output comprising a column value label and a column name label associated with terms in the natural language input. For example, the system can identify a term as a potential column name or column value, and label the identified term with a ColName label or a ColVal label. At 740, the system processes the natural language input along with the first output in a skip-chain CRF to obtain a second output comprising relationship information that links the term associated with the column value label and the term associated with the column name label. At 750, the system forms a search string based at least in part on the first output. For example, terms labeled as column values in the first output can be concatenated to form a search string. At 760, the system sends the search string to a search engine. The search engine can be any suitable general or special-purpose search engine, such as the Apache Lucene search engine, available from the Apache Software Foundation at http://lucene.apache.org. At 770, the system receives database search results from the search engine based at least in part on the search string. At 780, the system puts the database search results into order (e.g., based on respective relevance scores of the search results). At 790, the system presents the ordered database search results in the user interface.

Other steps not shown in exemplary techniques 500, 600, 700 also can be performed prior to, subsequent to, or concurrently with exemplary techniques 500, 600, 700. For example, training steps and database indexing steps can be performed prior to processing natural language input with cascaded CRFs or performing a search over a database.

E. Detailed Example

Names assigned to tables in a database may intentionally or unintentionally coincide with those given to columns in the same table or other tables. Therefore, many tools that use lexicon look-up (e.g., rule-based approaches) fail to distinguish between column names, table names, and table contents (or values).

This section describes an exemplary technique that uses machine learning models to help distinguish between column names, table names, and table contents, among other potential benefits. This exemplary technique takes a natural language query (also referred to as an "instance") as input, and produces a set of query results as output. The output set of query results can be referred to as "matched query results" or "search results." Matches need not be exact, and may instead be approximate. This exemplary technique can be used, for example, in a database management system having a natural language search interface. A system such as the system 100 shown in FIG. 1, the system 200 shown in FIG. 200, the system 300 shown in FIG. 3, or other system can perform this exemplary technique.

This exemplary technique can be described as having two stages. The first stage involves offline activities, such as training and deploying CRF-based machine learning models, which can then be used in the second stage. The second stage involves runtime activities, such as accepting natural language input (e.g., from a user entering a query) and providing results in response to the input using models that were trained and deployed in the first stage. The two stages need not be performed together, and can be performed by one or more computing devices.

This exemplary technique uses a CRF model in which two CRFs are applied sequentially to a sequence of words in a user query from which functional relationships can be extracted. In this exemplary technique, a first CRF identifies (or extracts) entities as column name and column value entities based on context, and a second CRF identifies relationships between the extracted entities.

A CRF model can be built using sample data for which its corresponding formal language query is known. Formal languages such as SQL, Prolog, and XML can be used to find and tag functional relationships among entities appearing in natural language queries for training a CRF model. In this exemplary technique, a first CRF (CrfS1) is trained to learn the natural language style (e.g., pattern and context) of referring to column names and column values. For example, CrfS1 is trained to label each instance with state labels to identify column names (ColName) and column values (ColVal) from a natural language query. A third state label (Other) is used to label words that are not ColName or ColVal. The second CRF (CrfS2) is trained to take as input the instance (that is, the natural language query) along with its label sequence (output from CrfS1), predict two nodes which can be connected using a skip-edge, and label the nodes with "Start" (or "Source") and End (or "Target") tags.

A CRF model can use clique templates to find subsets of nodes (or states) satisfying a given constraint (e.g., terms in a natural language query that represent a probable column name and a corresponding column value) that can be connected with an edge to form a clique. Such edges can be used to capture relations among terms in natural langue input. Unlike other "template-based" approaches to database queries, this exemplary technique uses clique templates to represent a set of relationship signatures, which the CRF is trained to learn and use in order to label nodes. Exemplary clique templates include bi-gram clique templates, skip-chain clique templates, and mapping label clique templates. Bi-gram clique templates capture relationships between the same type of nodes (e.g., either observed states or hidden states) present consecutively in the sequence. Skip-chain clique templates capture relationships between states that are functionally related but are "far apart" (e.g., not consecutive) in the state sequence. Mapping label clique templates are used to capture relationships between multiple labeling schema (e.g., between ColVal/ColName/Oth labels and Start/End labels) if available at observed states in a sequence.

In this exemplary technique, CrfS1 is a linear-chain CRF that captures sequence information with a bi-gram clique template available, for example, in the Mallet package. See McCallum, "MALLET: A Machine Learning for Language Toolkit," available at http://mallet.cs.umass.edu. In this context, bigrams are groups of two letters that are used for statistical analysis of text. Bi-grams can be used to help provide a conditional probability of a word occurring in text. In this exemplary technique, CrfS2 is a skip-chain CRF that uses a skip-chain clique template along with a bi-gram clique template, and skip edges connect ColName state labels with a corresponding ColVal state label.

Consider the following scenario for training a linear-chain CRF on a geographic information database. For the natural language query "Give me the cities in Virginia," a formal query can be written in a query language that corresponds to the geographic information database (e.g., "for $c in document ("geobase.xml")//city where $c/state="Virginia" return <result> {$c/text( )}</result>"), and part-of-speech (POS) tags and labels can then be assigned to words in the natural language query (e.g., "give VB|OTHER; me PRP|OTHER; the DT|OTHER; cities NNS|SV:ColName; in IN|OTHER; Virginia NNP|DM:ColVal"). Or, consider the following scenario for training a CRF on a jobs information database. For the natural language query "What jobs are there for web developer who knows 'C++'?" a formal query can be written in a query language that corresponds to the jobs information database (e.g., "for $j in document ("jobsdata.xml")//job where $j/title="web developer" and $j/language="CPP" return $j"). POS tags and labels can then be assigned to words in the natural language query (e.g., "what WP|OTHER; jobs NNS|SV:ColName; are VBP|OTHER; there EX|OTHER; for IN|OTHER; web NN|OTHER; developer NN|LCS:web developer; who WP|OTHER; know VB|OTHER; C NN|OTHER; +SYM|OTHER; +SYM|OTHER; ?.|OTHER").

Embodiments of the described technologies can use vector representation of an instance (e.g., a document, text sentence, or user query) to be classified. Such vectors can be referred to as feature vectors, and can be presented by the equation $F=[f_1, f_2, \ldots]$, where $f_n$ is a feature that addresses a particular criterion to aid classification algorithms in distinguishing instances belonging to different classes. Many different functional routines can be used for computing values of particular feature vectors with respect to a current instance under consideration. Therefore, F also can be defined as $F=[f_1(x), f_2(x), \ldots]$, where x is a current instance of a natural language query as a state sequence for which the feature vector is being computed. Several feature types can be used to represent a single instance. One common feature type is bag-of-words, where each word appearing in a text becomes a Boolean feature that indicates presence or absence of the word in a current instance. Thus, a bag-of-words model represents a text as an unordered collection of words. Other feature types include domain-specific features and part-of-speech (POS) features.

In this exemplary technique, CrfS1 uses conventional bag-of-words features along with POS tags, while CrfS2 uses tags predicted by CrfS1 along with the features used for CrfS1. By using skip-edges, the model in CrfS2 aims to find additional edges connecting ColName and ColVal nodes. The skip-edge does not impose any constraints on the order of the tags for the nodes it is connecting: the skip-edge indicates a possible relationship between the nodes, but does not specify an ordering of the nodes. The Start node can be either a column name node or a column value node, and the End node can be either a column name node or a column value node. States that are not Start or End states can be labeled as Other.

Figure 8:
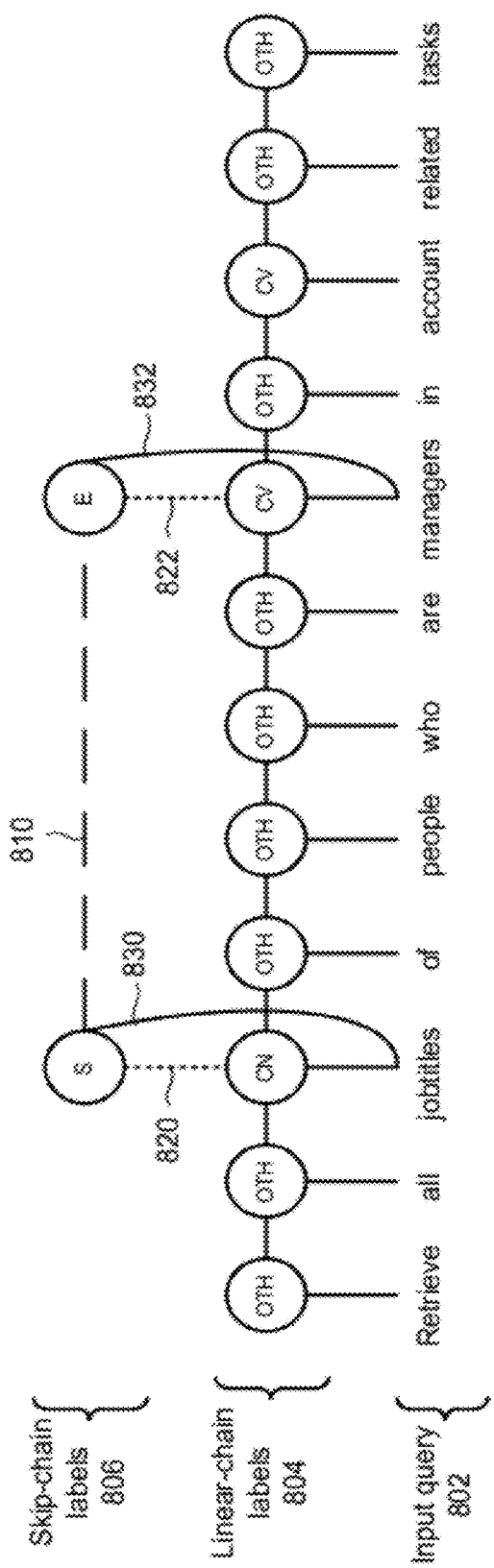
FIG. 8 and FIG. 9 are diagrams of natural language queries with labels and mapping information after processing with cascaded conditional random fields according to some embodiments described herein.

FIG. 8 is a diagram of a natural language query 802 with labels and mapping information after processing with cascaded CRFs. The labels and mapping information shown in FIG. 8 can be produced, for example, by processing the natural language query 802 with the cascaded CRFs shown in system 100 (FIG. 1), system 200 (FIG. 2), or system 300 (FIG. 3). In the example shown in FIG. 8, an input natural language query 802 has been annotated with linear-chain CRF labels 804 and skip-chain CRF labels 806. The linear-chain labels 804 include column value labels (ColVal, or "CV" in FIG. 9), a column name label (ColName, or "CN" in FIG. 8) and Other labels ("OTH" in FIG. 8). The solid lines between adjacent linear-chain labels 804 indicate bi-gram edges obtained with a bi-gram clique template in a linear-chain CRF. As shown in FIG. 8, two words ("managers" and "account") in input natural language query 802 are labeled "CV" to indicate that they are potential column values. The skip-chain labels 806 include Start ("S" in FIG. 8) and End ("E" in FIG. 8). Dotted line 820 indicates a mapping between a ColName label and a Start label. Dotted line 822 indicates a mapping between a ColVal label and an End label. Dotted lines 820, 822 indicate a mapping edge obtained with a mapping label clique template. Dashed line 810 indicates a mapping between the node labeled with the Start label and the node labeled with the End label. Dashed line 810 indicates a skip-edge obtained with a skip-chain clique template in a skip-chain CRF. Curved line 830 shows that the node labeled with the Start label is associated with the word "jobtitles" in input natural language query 802. Curved line 832 shows that the node labeled with the End label is associated with the word "managers" in input natural language query 802. As shown in FIG. 8, the word "account" does not have a corresponding skip-chain label, despite being labeled as a potential column value, because the skip-chain CRF did not identify the word "account" as being part of a column name/value pair.

Figure 9:
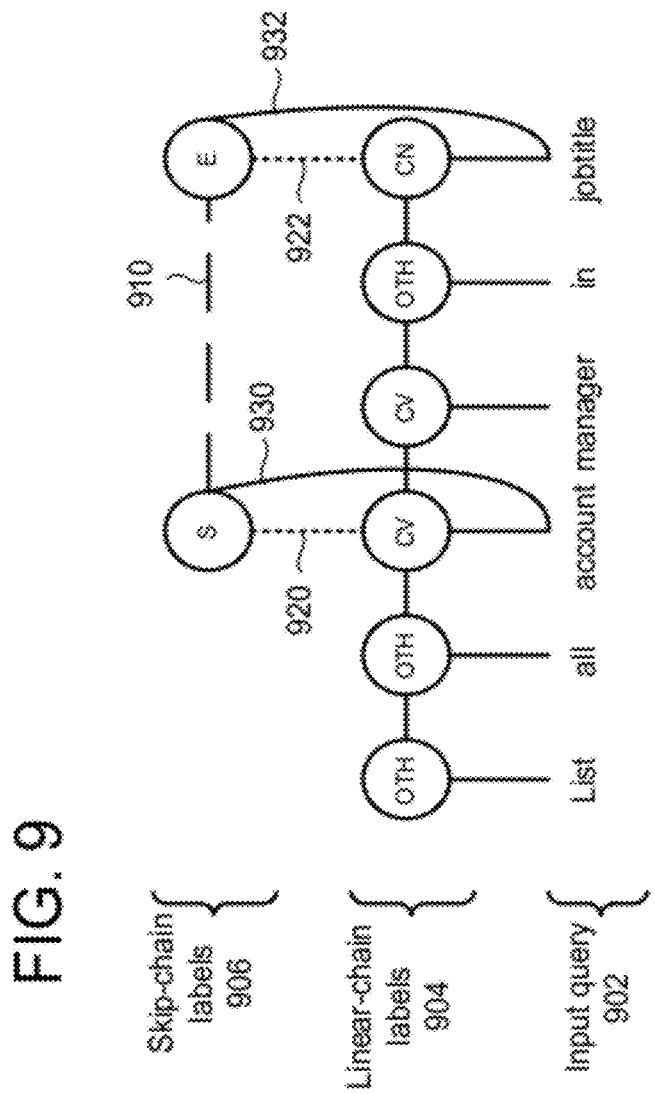

FIG. 9 is a diagram of a different natural language query 902 with words that are similar to the natural language query 802 shown in FIG. 8. The labels and mapping information shown in FIG. 9 can be produced, for example, by processing the natural language query 902 with the cascaded CRFs shown in system 100 (FIG. 1), system 200 (FIG. 2), or system 300 (FIG. 3). In the example shown in FIG. 9, an input natural language query 902 has been annotated with linear-chain CRF labels 904 and skip-chain CRF labels 906. The linear-chain labels 904 include column value labels (ColVal, or "CV" in FIG. 9), a column name label (ColName, or "CN" in FIG. 9) and Other labels ("OTH" in FIG. 9). As shown in FIG. 9, two words ("manager" and "account") in input natural language query 902 are labeled "CV" to indicate that they are potential column values. The skip-chain labels 906 include Start ("S" in FIG. 9) and End ("E" in FIG. 9). Dotted line 920 indicates a mapping between a ColVal label and a Start label. Dotted line 922 indicates a mapping between a ColName label and an End label. Dashed line 910 indicates a mapping between the node labeled with the Start label and the node labeled with the End label. Curved line 930 shows that the node labeled with the Start label is associated with the word "account" in input natural language query 902. Curved line 932 shows that the node labeled with the End label is associated with the word "jobtitle" in input natural language query 902. As shown in FIG. 9, the word "manager" does not have a corresponding skip-chain label, despite being labeled as a potential column value, because the skip-chain CRF did not identify the word "manager" as being part of a column name/value pair. A comparison of FIGS. 8 and 9 shows that different meanings in natural language queries that use similar words can be detected by systems implementing described technologies.

In this exemplary technique, error minimization also can be performed. Because there are more likely to be fewer skip-chain labels (e.g., "Start" and "End" labels) as compared to linear-chain labels (e.g., ColName and ColVal labels), an error minimization function can treat skip-chain labeling with less importance compared to linear-chain labeling.

As explained above, this exemplary technique can be divided into offline activities and runtime activities. Offline activities include indexing the database to be searched and building CRF Models using training data. Runtime activities include using CRF models to tag a natural language query representing a functional relationship among entities. These functional relationships are used to credit and alter scores of search hits from the index, which match these relationships.

In this exemplary technique, at runtime, words labeled as column value (ColVal) in the output of CrfS1 are concatenated to form a search string (e.g., individual words separated by spaces) according to a bag-of-words model. That is, words labeled as column values can be concatenated in the search string without regard to sentence syntax or semantics.

This search string is queried over an index of the database to retrieve search hits. Search hits and corresponding default scores are obtained from a full-text search engine (e.g., Apache Lucene or any other suitable search engine) based on string comparison. Among these search hits, the instances whose column values match with those identified using CrfS1 are credited with an additional CrfS1 parametric score depending on the nature of the match. Scores for entities whose column names and column value pairs match the pairs in the output from CrfS2 (which tries to label the possible pairs with tags Start and End) are credited even more, moving such hits nearer the top in a sorted search list. While searching for matched entities during these two steps, different weights are assigned for matching instances based on a match type. For example, in decreasing order of assigned weights, possible match types include full-word match, stemmed match, substring match, LCS (longest common sub-string) match, WordNet-based match, and n-gram character match. Scores obtained for search hits can be used in sorting to obtain ordered search results considering the functional relationships (i.e. the potential relationship between ColName and ColVal entities after application of CrfS2).

In addition to simple queries (e.g., term matching), this exemplary technique can accommodate other query types, such as logical queries, range queries and join queries. This exemplary technique also can accommodate queries that have more than one query type (e.g., range-join queries) and nested queries. Further training of the machine learning models can be performed (e.g., with training data specific to the desired type of query, such as a range query), or domain-specific heuristic rules can be used. Heuristic rules can be used, for example, in cases where the availability of CRF training data is limited for desired query types.

For example, to identify and formulate range queries, heuristic rules or a classifier such as a support vector machine (SVM) can be used to capture patterns present in natural language queries such as "salary greater than $8000" or "employer ID less than 2000." An exemplary heuristic rule would be to look for a pattern such as "<ColVal Entity><Range Query Indicator><Numeric Value>," where <Range Query Indicator> can be a word or phrase such as "above," "below," "not more than," "less than," "greater than," "fewer than," "equal to," "equals," or other such terms than can be used for quantitative comparisons.

As another example, to identify and formulate logical queries, an exemplary heuristic rule would be to look for logical operators (also referred to as logical connectives), (e.g., words such as "AND," "OR," or "ALSO") in the natural language input. A processing step to flatten logical queries (e.g., reformulating queries such as "show all records with job title as accountant AND min salary equal to 8200" into sub-queries such as "show all records with job title as accountant" and "show all records with min salary equal to 8200") can be used. After flattening, the sub-queries can be treated as independent queries and results can be merged depending on the logical operator (e.g., "AND") connecting the sub-queries.

As another example, to identify and formulate join queries, relevant database tables can be identified in the natural language input, and materialized views can be created from the respective tables in the database. These materialized views then can be used for performing the join query.

F. Exemplary Equations and Implementation Details

This section describes Equations 1-13 shown in FIG. 10 and exemplary implementation details shown in FIGS. 11 and 12. The equations relate to embodiments of described natural language query tools with cascaded CRFs, and can be used to describe, for example, aspects of the exemplary technique described above. For example, the equations described in this section describe conditional probabilities and accuracy for CrfS1 and CrfS2. The exemplary implementation details (e.g., techniques 1100 and 1200, shown in FIGS. 11 and 12, respectively) relate to techniques that can be performed by embodiments of described natural language query tools with cascaded CRFs. Alternatively, a natural language query tool can use CRFs that operate according to other models.

CRFs can use conditional probabilities to estimate a probable hidden state sequence $\{y_1, y_2, \ldots y_T\}$ from an observed state sequence $\{x_1, x_2, \ldots x_T\}$. More formally, if P(y, x) is the joint probability of a hidden label sequence with respect to an observed state sequence, the conditional probability P(y|x) can be represented as shown in Equation 1 in FIG. 10, where the denominator is a normalization constant that measures joint probability of an observed state sequence with respect to all possible hidden state sequences. The conditional probability can be estimated during training where a set of training data is chosen (e.g., using cross-validation techniques) for learning the parameters of Equation 1.

A user query can be represented as an undirected graph model, with observed states corresponding directly to search key words of the user query. The graph can be augmented with labels using the CRF model. Edges can be created using clique templates which model the process of finding subsets of nodes satisfying a given constraint that can be connected to form a clique, $c_p$. For example, nodes that represent a probable column name and a corresponding column value pair can be connected with an edge. A clique template is a set of factors and their corresponding parameters which help in creating a graph out of available data instances. If $\Phi_t$ denotes potential functions applicable to elements at position t in a state sequence, and if $y_0$ denotes an imaginary initial state to capture start state probabilities, the clique template for a linear-chain CRF can be expressed as shown in Equation 2.

Based on matching criteria, clique templates can be divided into two categories: local clique templates and global clique templates. Local clique templates are those in which the number of hidden states in the clique is one. Local clique templates can be used to capture the relationship between entities observed in the input query and the label. Global clique templates are those in which the number of hidden states in the clique are greater than one. Global clique templates capture the relationship between multiple entities from the input query, which can be far apart in the sequence. If C is a set of clique templates, and $\Phi_C$ denotes the factors corresponding to clique template $C_p$, the conditional probability in Equation 1 in terms of clique templates can be written as shown in Equation 3, where, $y_c$ and $x_c$ are the states within the sequence to which the clique templates are applicable. Z(x), which can be referred to as a partition function, is the sum of scores of all the possible hidden state sequences for the observed state sequence x.

If $\theta_p$ represents the set of parameters associated with the clique $C_p$ (vector of $\lambda$), K represents the total number of templates, and vector $|f_k|$ represents features, then $\Phi_C$ which indicates a clique factor applicable for clique $C_p$ can be expressed as shown in Equation 4. Parameters $\theta_p$ can be learned using inference algorithms during training. Equation 5 is a modified version of Equation 4 to represent clique factors between labeling sequences, $l_m$ and $l_n$.

Clique factors are functions which represent a clique template. For example, to represent a linear-chain template according to the exemplary technique described above, clique factors which capture the ordered sequence of labels (e.g., Oth, ColVal and ColName labels) can be used. Values of clique factors (e.g., values of the functions obtained at positions in the graph) can be combined (e.g., by multiplying them) to obtain a conditional probability value. For example, for CrfS1, the conditional probability (P(y|x)) can be calculated as shown in Equation 3 (with the linear-chain clique factors C shown in Equation 2), and also can be written as shown in Equation 6, where Z(x) is a normalization constant which varies from one observed state sequence (x) to the other, as shown in Equation 7. Equation 6 also can be referred to as a linear-chain inference function.

If T is the length of the sequence, $\Phi$ and $\psi$ are clique factors for linear-chain and skip-chain CRFs, and $y_0$ represents an imaginary start state, the conditional probability (P(y|x)) for CrfS2 can be stated as shown in Equation 8, where $\Phi(y_1, y_0, x)$ gives the start state probabilities. In Equation 8, the clique factors corresponding to linear-chain are given as $\Phi_t$, while the clique factors corresponding to skip-chain are given by the product terms with subscripts u and v (e.g., $\psi_{uv}$). The individual factors can in turn be computed as shown in Equations 9 and 10.

In Equation 9, $\lambda_{1k}$ corresponds to linear-chain (CrfS1) parameters learned over training data, and $f_{1k}$ corresponds to the potential inferred from state t−1 to state t at time stamp t. In Equation 10, $\lambda_{2k}$ corresponds to skip-chain (CrfS2) parameters, and the potential $f_{2k}(y_u, y_v, x, u, v)$ has significant value only when state u is either ColName or ColVal and v represents its corresponding ColVal or ColName, respectively. If $P_l(y|x)$ and $P_s(y|x)$ represent linear-chain and skip-chain conditional probabilities, respectively, obtained for input state sequence x, the combined accuracy P(y|x) of the cascaded CRF model in the exemplary technique described above can be written as shown in Equation 11. Equation 11 combines both linear-chain ($P_l$) and skip-chain ($P_s$) functions, and can be referred to as a cascaded CRF inference function.

In Equation 12, IndexerScore$_i$ denotes a search result score obtained for a particular search hit. For example, in a system that uses the Apache Lucene search engine, IndexerScore$_i$ can represent a score provided by the Lucene scoring formula. However, other scoring formulas (e.g., scoring formulas used by other search engines) also can be used. The altered score which includes credit for a match in the functional relationship in that search hit can be represented as shown in Equation 12, where $W_{S1}$ represents a weight (also referred to as a reward weight) for a result (e.g., a database record, or row) that matches entity information produced by CrfS1 (e.g., a term with a ColVal label matches a column value in the result, or a term with a ColName label matches a column name in the result), and where $W_{S2}$ represents a weight for a result that matches relationship information produced by CrfS2 (e.g., a term with a ColVal label mapped to a term with a ColName label matches a column value in the result from a corresponding column).

FIG. 11 outlines an exemplary technique 1100 for computing weights $W_{S1}$ and $W_{S2}$ for scoring search results. According to technique 1100, labels are assigned to the sequence in x using a first CRF (CrfS1) in step 1. Frequency of hits on terms with ColVal and ColName tags are found in steps 2 and 3, respectively, using a Kronecker delta function ($\delta$). The value of the Kronecker delta function is 1 only when the two variables that are taken as arguments represent the same value, and 0 otherwise. The IF condition in step 4 checks if there are hits on terms with ColName and ColVal tag and calculates the weight $W_{S1}$ in step 5 based the result. Labels are assigned to the sequence using a second CRF (CrfS2) in steps 6 and 7. The frequency of hits on terms with Start tags is found in step 8. The IF condition in step 9 checks for hits on terms with Start tags and calculates the weight $W_{S2}$ in step 10 based on the result. If there are no hits on terms with ColName tags, it adds a penalty (−γ) in step 13, in order to provide more credit to records which have do have hits on ColName.

FIG. 12 outlines an exemplary technique 1200 for sorting search results. In exemplary technique 1200, weights are calculated in step 1 (e.g., as calculated in exemplary technique 1100), which will be assigned to records based on matching criteria. A search query is formulated in step 2, and the query is executed in step 3 to retrieve search hits. Terms that do not match any column values can be filtered out. The FOR loop in step 4 iterates over the search hits, altering scores by increasing them (steps 8 and 10) as appropriate based on column value matches in step 5 and paired entity matches (e.g., a match in ColName and its corresponding ColVal) in step 6 which meet the threshold values $\tau_{CrfS1}$ and $\tau_{CrfS2}$ (steps 7 and 9) respectively. Scores can then be sorted in based on the altered scores in Step 13.

The accuracy of a CRF model built with training data represented as set $\{x\}$ can be represented as shown in Equation 13, where $\hat{x}_i$ is a bag-of-words representation with ColName and ColVal extracted and terms labeled Start and End, and where $J(\hat{x}, I)$ represents the similarity measure of the words in $\hat{x}$ with meta information I from the database (e.g., actual names given to tables and columns).

A naming convention that is followed in naming columns and tables of the database can have an effect on the final accuracy. From Equation 13 it can be inferred that as similarity among column names and table names increases, the accuracy of that particular database decreases. In the exemplary technique, the scores that can be used for sorting results based on relevance to a natural language query (x) can be a product of accuracies obtained in CrfS1, CrfS2, and the similarity of words in x labeled as ColName and ColVal with the actual column names and values from the database. The final term in the product in Equation 13 penalizes poor database naming conventions, which can make differentiating column names, table names and their values nearly impossible. For example, consider a naming convention for columns which host employee names and their respective departments. A database that names these columns "Employee Name" and "Employee Dept Name," respectively, can lead to less accurate results compared to a database that names these columns "Employee Name" and "Department," respectively. Hence, the normalization constant can be important during database design time. A database with a lower value in the denominator in Equation 13 will yield more accurate (or confident) results. Because the CRF model in the exemplary technique described above is built using part-of-speech (POS) as one of the features, and because column names and column values are often nouns, it can be helpful to choose nouns for naming tables and columns in a database. This helps in obtaining good accuracy.

G. Experimental Results

This section describes experimental results relating to aspects of the exemplary technique described above. Two datasets (JobQuery and GeoQuery, available from the University of Texas) are used for experimentation. These datasets contain natural language queries along with equivalent formal query language statements. From the formal language in these instances, column names and column values are identified for use in manual labeling. The code base was written in Java using application programming interfaces (APIs) including the Mallet API from the Mallet package and another API to obtain POS tags for input terms. In these exemplary experiments, cascaded CRFs are used to capture relationships without differentiating the order of tags (e.g., Start and End tags) that appear as end points of the entities for which a skip edge is created. The databases used in these exemplary experiments is indexed using Apache Lucene.

The exemplary experiments described in this section were conducted by varying parameters such as training dataset, testing dataset, labeling, and templates used, and using a 5-fold cross validation technique. Table 1 shows names of CRFs used in experiments described in this section, with their corresponding meanings.

TABLE 1

Names of CRFs used in experiments, with corresponding meanings.

| CRF Name | Training data | Testing data | Stage | Template |
|---|---|---|---|---|
| TATAS2B | All | All | S2 | Bi-gram |
| TATAS2S | All | All | S2 | Skip-chain |
| TGTGS2B | GeoQuery | GeoQuery | S2 | Bi-gram |
| TGTGS2S | GeoQuery | GeoQuery | S2 | Skip-chain |
| TJTJS2B | JobQuery | JobQuery | S2 | Bi-gram |
| TJTJS2S | JobQuery | JobQuery | S2 | Skip-chain |
| TATAS2BM | All | All | S2 | Bi-gram, Mapping |
| TATAS2BMS | All | All | S2 | Bi-gram, Mapping, Skip-chain |
| TATAS2B | All | All | S2 | Bi-gram |
| TATAS2S | All | All | S2 | Skip-chain |

In Table 1, "Training Data" and "Testing Data" indicate whether the JobQuery dataset, the GeoQuery dataset, or both datasets ("All") are used during training and testing, respectively. "Stage" indicates that all the CRFs in the table are used in stage S2, which involves labeling with Start, End and Other tags. "Template" indicates the template that is used for labeling (e.g., bi-gram, skip-chain, or mapping). Implicitly, skip-chain templates can include hi-gram templates.

Tables 2 and 3, below, show results of two sets of experiments. In Tables 2 and 3, "P" indicates a precision score (a fraction of results that are relevant to the search), "R" indicates a recall score (a fraction of relevant results that were successfully retrieved), and "FM" indicates the F-measure, which combines precision and recall scores using a harmonic mean that gives equal weights to precision and recall.

A first set of experiments compared a skip-chain CRF with a near-chain CRF. Results of the first set of experiments are shown in Table 2,

TABLE 2

Results from experiments comparing skip-chain CRF with linear-chain CRF.

| CRF Name | P | R | FM | Training Time (sec) | Testing Time (sec) |
|---|---|---|---|---|---|
| TATAS2B | .889 | .743 | .810 | 214 | 7 |
| TATAS2S | .917 | .763 | .833 | 366 | 7 |
| TGTGS2B | .951 | .817 | .879 | 94 | 3 |
| TGTGS2S | .960 | .817 | .883 | 101 | 3 |
| TJTJS2B | .798 | .634 | .707 | 113 | 4 |
| TJTJS2S | .827 | .723 | .771 | 220 | 5 |

Figure 13:
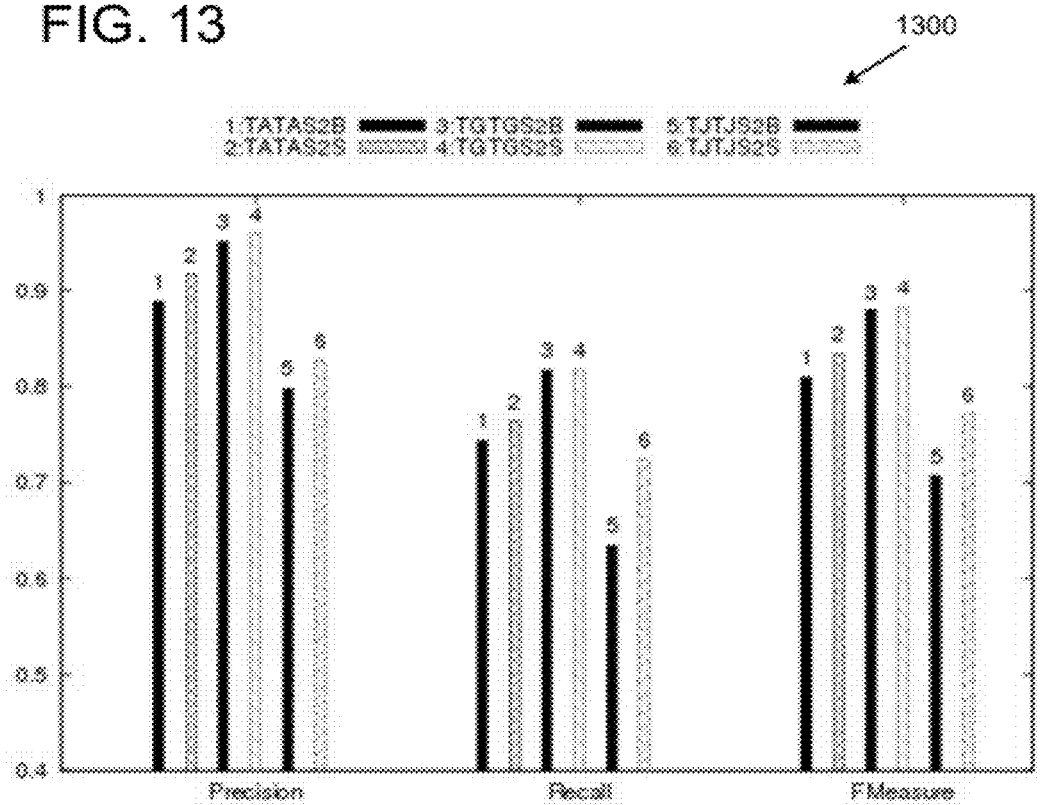
FIG. 13 shows a chart of results of experiments that compare a skip-chain CRF with a linear-chain CRF with training and testing performed on different datasets.

In the first set of experiments, the CRF versions use tagged training data for CrfS2 in place of tagged data that would otherwise come from CrfS1: ColName and ColVal entities are identified in the training data with a formal database language equivalent of natural language queries corresponding to the instances in the dataset. The first set of experiments use the GeoQuery dataset, the JobQuery dataset, and a combination of both datasets. FIG. 13 shows a chart 1300 of the results shown in Table 2. The solid bars in FIG. 13 (numbered 1, 3, and 5) indicate the linear-chain versions and the patterned bars (numbered 2, 4 and 6) indicate the skip-chain versions. The sets of bars (1, 2), (3, 4), and (5, 6) give the experimental results for the combined GeoQuery and JobQuery datasets, the GeoQuery dataset alone, and the JobQuery dataset alone, respectively. The skip-chain version provides better quality results than its respective linear chain version. The precision is found to be over 79 percent for all of the test cases studied in the examples shown in Table 2. However, recall is found to be low for a few test cases, signifying higher false negatives. Table 2 also shows running times as well as the quality of search results. The skip-chain versions are observed to take more training and testing time than the linear-chain versions.

A second set of experiments compared cascaded CRFs with dynamic CRFs (DCRF). DCRFs are another form of CRF that can be used to label natural language input. Results of the second set of experiments are shown in Table 3.

TABLE 3

Results from experiments comparing cascaded CRFs with dynamic CRF (DCRF)

| Type | CRF Name | P | R | FM | Training Time (sec) | Testing Time (sec) |
|---|---|---|---|---|---|---|
| DCRF | TATAS2BM | .885 | .688 | .775 | 1681 | 42 |
| DCRF | TATAS2BMS | .887 | .684 | .773 | 2047 | 51 |
| CCRF | TATAS2B | .897 | .632 | .741 | 228 | 7 |
| CCRF | TATAS2S | .901 | .733 | .808 | 301 | 7 |

Figure 14:
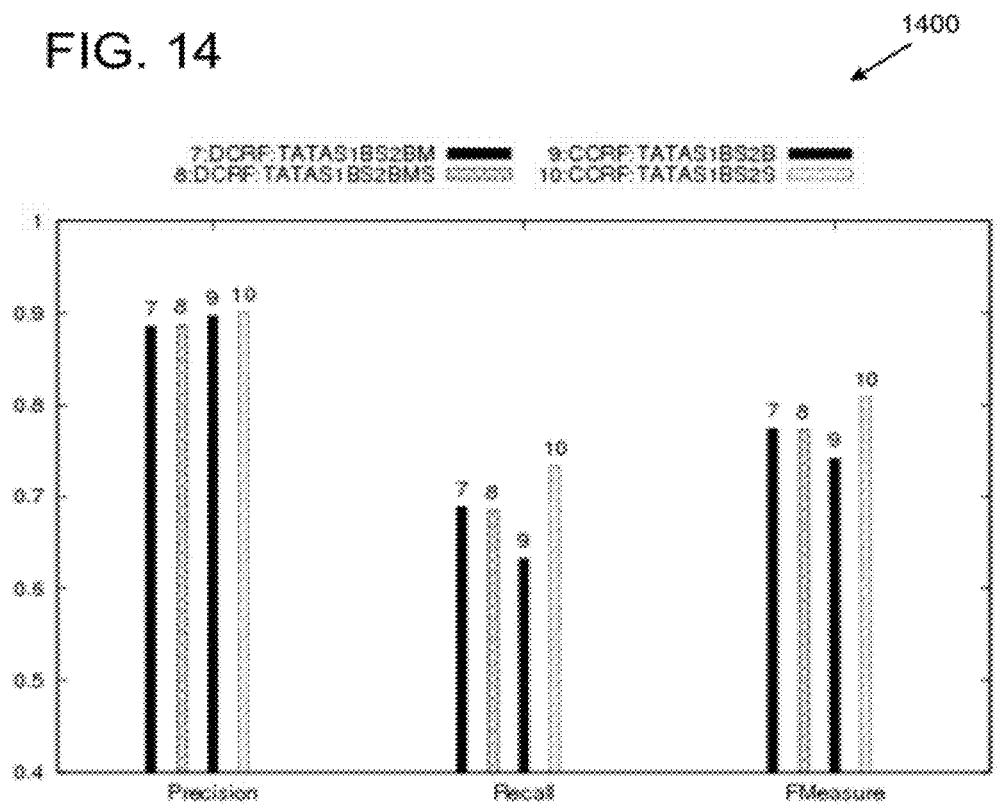
FIG. 14 shows a chart of results from experiments comparing cascaded conditional random fields implemented by some natural language query processing embodiments described herein with dynamic conditional random fields.

In the second set of experiments, training and testing of the cascaded CRFs and the DCRF were repeated with linear-chain (bi-gram template) and skip-chain clique templates for CrfS2 and a second layer of the DCRF, respectively. For cascaded CRFs, linear-chain CrfS1 is used for labeling Col-Name and ColVal, which is given as input to CrfS2. The performance of the skip-chain version of the cascaded CRFs over DCRF is also found to be better both on running times as well as quality of search results. As shown in Table 3, capturing additional functional relationships with the help of skip-edges results in improved accuracy. In Table 3, it can be noted that by adding skip edges to DCRF, we observe an increase in precision (with slight decrease in recall). The increase in precision is observed to be quite small due to the limited availability of skip edges compared to linear chain edges for the studied datasets. More can be performed on other datasets to assess usefulness of skip chains for DCRF. FIG. 14 shows a chart 1400 of the results shown in Table 3. Bars labeled 9 and 10 show cascaded CRF results, and bars labeled 7 and 8 show DCRF results.

Figure 15:
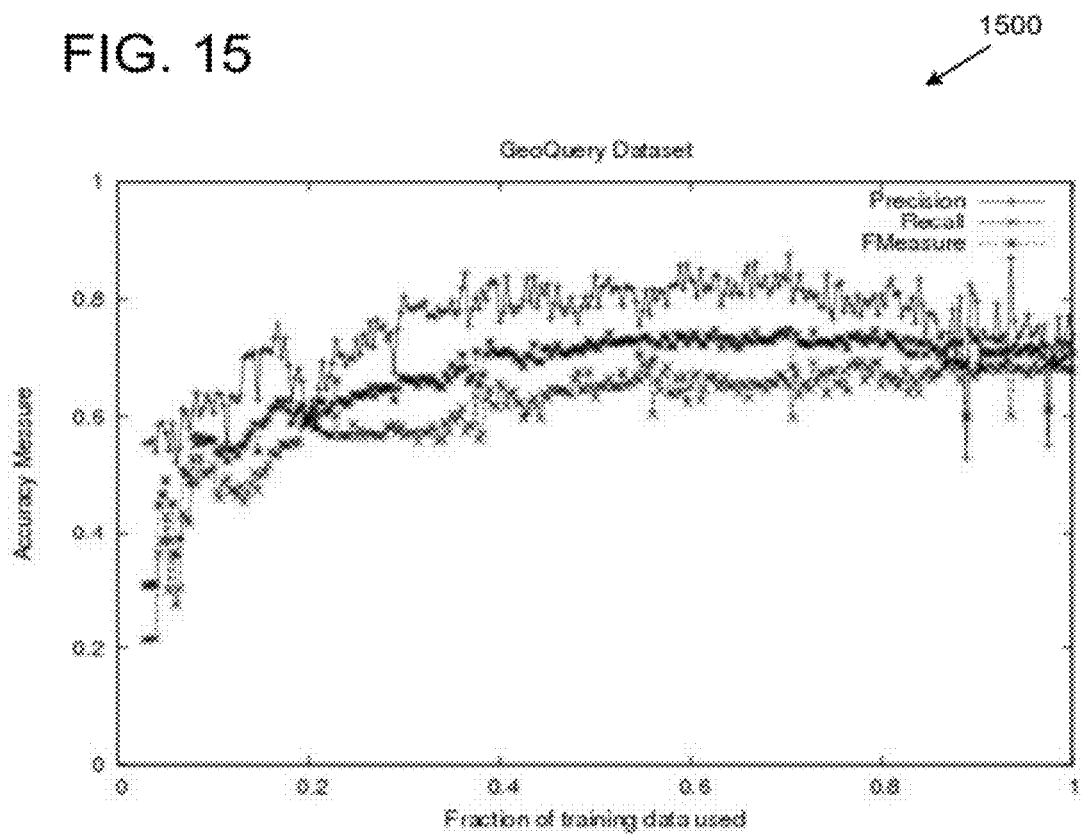
FIG. 15 shows a chart of effects on accuracy of training data size (e.g., fraction of training data) of a first training dataset.
Figure 16:
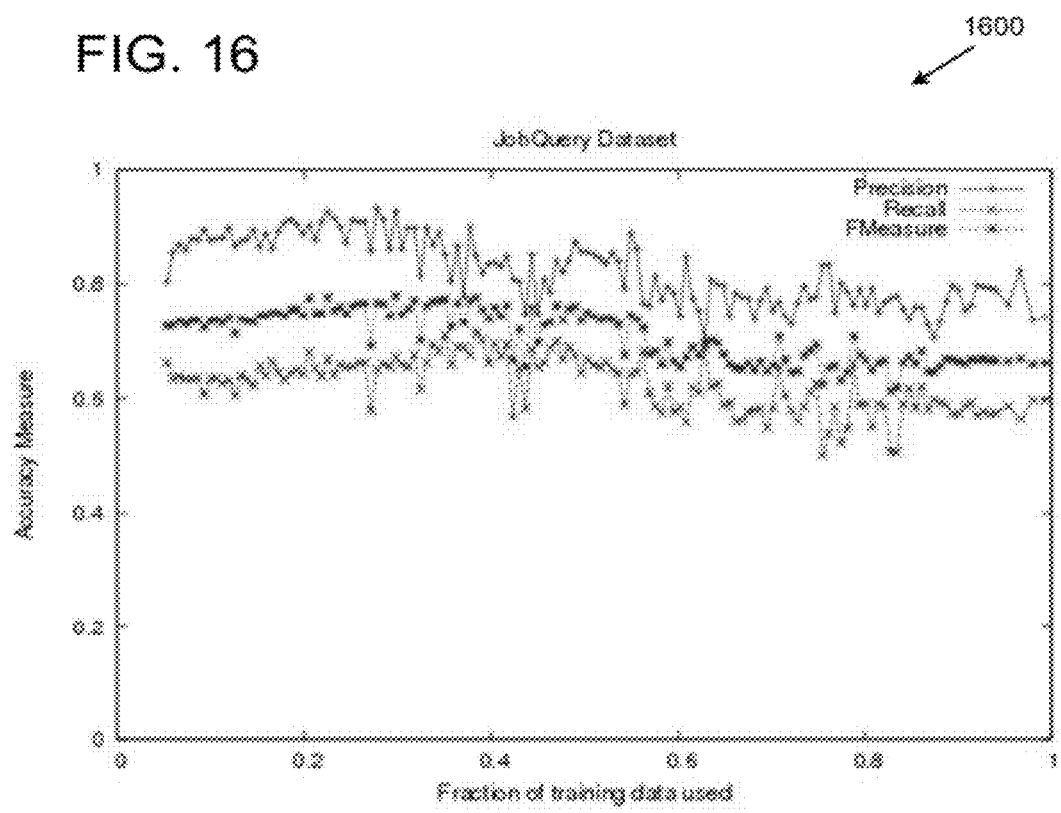
FIG. 16 shows a chart of effects on accuracy of training data size (e.g., fraction of training data) of a second training dataset.

A third set of experiments assessed the effect of training dataset size on accuracy of search results. Increasing training data size can lead to higher training time; training data size can be adjusted to improve results. Results of the third set of experiments are shown in charts 1500 and 1600 in FIGS. 15 and 16. Charts 1500 and 1600 show effects on accuracy of training data size (e.g., fraction of training data) with respect to the GeoQuery dataset and JobQuery dataset, respectively (e.g., the effect of training data size on precision, recall and F-measure). The trend in charts 1500 and 1600 shows that good performance is obtained with nearly 60 percent and 35 percent of training data for GeoQuery and JobQuery datasets, respectively.

A fourth set of experiments compared ordered search results retrieved using the Lucene index with ordered scores obtained after taking into consideration the CRF scores, as shown in Table 4, below.

TABLE 4

Comparison of Lucene scores with CRF-based scores

| Lucene score | CRF-based score | Job Id | Job Title | Department |
|---|---|---|---|---|
| 0.07179135 | 0.19599556 | SA ACCOUNT | Accountant | Sales |
| 0.08040842 | 0.19185546 | SA MAN | Manager | Sales |
| 0.20925795 | 0.10462897 | AC MGR | Accounting Manager | Accounts |
| 0.07179135 | 0.0878743 | FI ACCOUNT | Accountant | Finance |
| 0.06497328 | 0.068382315 | AC ACCOUNT | Public Accountant | Accounts |
| 0.03965569 | 0.019827846 | FI MGR | Finance Manager | Finance |
| 0.03965569 | 0.019827846 | ST MAN | Stock Manager | Stocks |
| 0.03965569 | 0.019827846 | PU MAN | Purchasing Manager | Purchase |
| 0.03965569 | 0.019827846 | MK MAN | Marketing Manager | Marketing |

In Table 4, in calculating the CRF-based scores, the CRFs used for CrfS1 and CrfS2 are linear-chain and skip-chain CRFs, respectively. The underlying relational database on which the experiments are carried out is a sample employee database available from Oracle Corporation. The sample employee database has three tables (Departments, Employees and Jobs). A sample query ("list all search results for accountants and managers from sales department") is executed on the Jobs table. As shown in Table 4, Lucene gave a maximum score for the record with Job Title="Accounting Manager" because there is some matching with words like "accountants" and "managers" in the sample query. The CRF-based scores reflect the interpretation by the CRF-based model that the search is for accountants and managers who are working in the sales department. In the CRF-based scores, the records with Department="Sales" are given extra credit over other matches. "Manager" and "Accountant" in the sales department are scored by the CRF-based model as the top two results.

Figure 17:
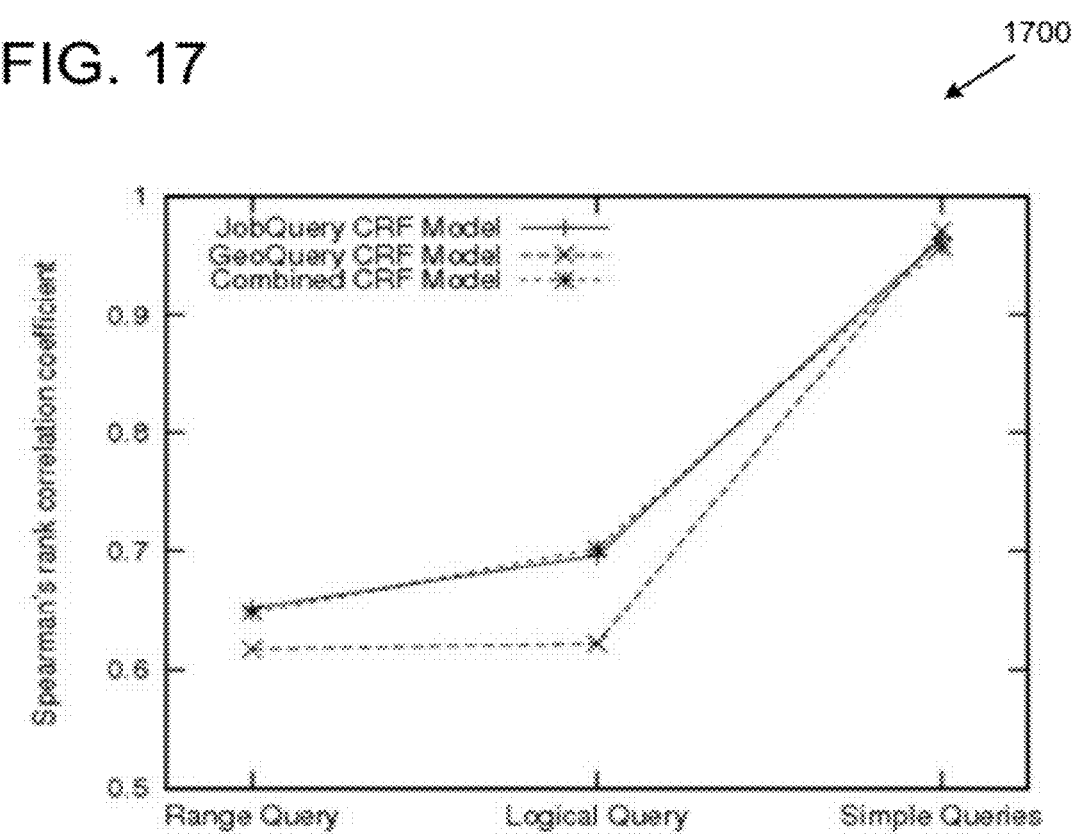
FIG. 17 shows a chart of an evaluation of ranking order of results generated by cascaded conditional random fields implemented by some natural language query processing embodiments described herein.

In order to evaluate ranking efficiency, the order of results generated by an exemplary cascaded CRF model described herein was compared with a manually tagged evaluation dataset for a defined set of natural language queries. The manually tagged evaluation dataset has 20 natural language questions each in evaluation datasets for simple queries, logical queries and range queries, with corresponding desired result orders. Spearman's rank correlation coefficient is used to give a correlation between a manually assigned ranking order and the ranking order predicted by the exemplary cascaded CRF. FIG. 17 shows a chart 1700 with the X-axis showing three points corresponding to range, logical and simple queries, and with Spearman's rank correlation coefficient score on the Y-axis.

III. Exemplary Computing Environment

Figure 18:
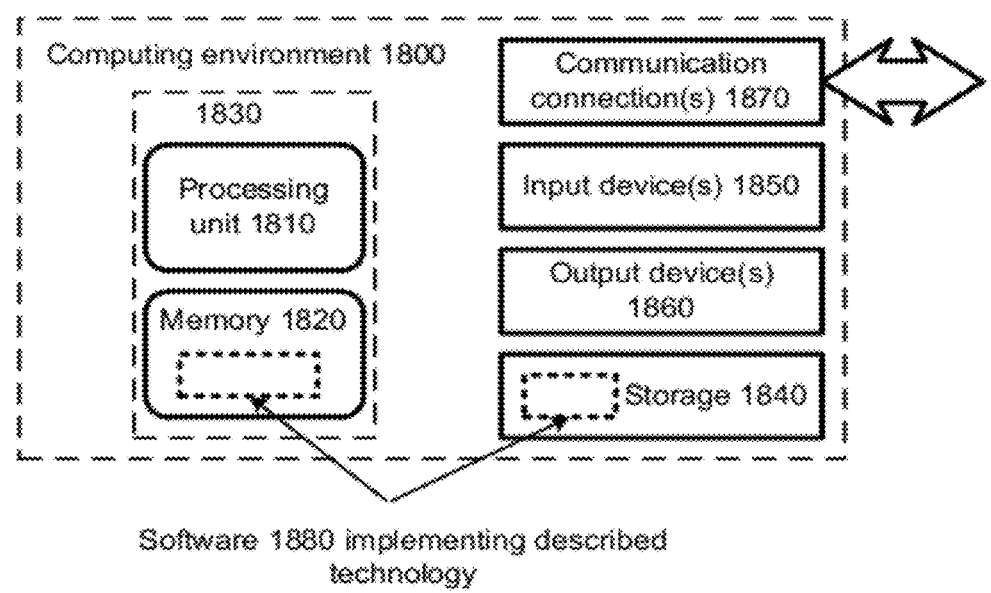
FIG. 18 is a block diagram of an exemplary computing environment suitable for implementing technologies described herein.

FIG. 18 illustrates a generalized example of a suitable computing environment 1800 in which the described technologies can be implemented. The computing environment 1800 is not intended to suggest any limitation as to scope of use or functionality, as the technologies may be implemented in diverse general-purpose or special-purpose computing environments.

With reference to FIG. 18, the computing environment 1800 includes at least one processing unit 1810 coupled to memory 1820. In FIG. 18, this basic configuration 1830 is included within a dashed line. The processing unit 1810 executes computer-executable instructions. In a multi-processing system, multiple processing units execute computer-executable instructions to increase processing power. The memory 1820 may be non-transitory memory, such as volatile memory (e.g., registers, cache, RAM), non-volatile memory (e.g., ROM, EEPROM, flash memory, etc.), or some combination of the two. The memory 1820 can store software 1880 implementing any of the technologies described herein.

A computing environment may have additional features. For example, the computing environment 1800 includes storage 1840, one or more input devices 1850, one or more output devices 1860, and one or more communication connections 1870. An interconnection mechanism (not shown) such as a bus, controller, or network interconnects the components of the computing environment 1800. Typically, operating system software (not shown) provides an operating environment for other software executing in the computing environment 1800, and coordinates activities of the components of the computing environment 1800.

The storage 1840 may be removable or non-removable, and includes magnetic disks, magnetic tapes or cassettes, CD-ROMs, CD-RWs, DVDs, or any other non-transitory computer-readable media which can be used to store information and which can be accessed within the computing environment 1800. The storage 1840 can store software 1880 containing instructions for any of the technologies described herein.

The input device(s) 1850 may be a touch input device such as a keyboard, touchscreen, mouse, pen, or trackball, a voice input device, a scanning device, or another device that provides input to the computing environment 1800. The output device(s) 1860 may be a display, printer, speaker, CD- or DVD-writer, or another device that provides output from the computing environment 1800. Some input/output devices, such as a touchscreen, may include both input and output functionality.

The communication connection(s) 1870 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Any of the storing actions described herein can be implemented by storing in one or more computer-readable media (e.g., non-transitory computer-readable storage media or other tangible media). Any of the things described as stored can be stored in one or more computer-readable media (e.g., computer-readable storage media or other tangible media).

Any of the methods described herein can be implemented by computer-executable instructions in (e.g., encoded on) one or more computer-readable media (e.g., non-transitory computer-readable storage media or other tangible media). Such instructions can cause a computer to perform the method. The technologies described herein can be implemented in a variety of programming languages.

Any of the methods described herein can be implemented by computer-executable instructions stored in one or more non-transitory computer-readable storage devices (e.g., memory, CD-ROM, CD-RW, DVD, or the like). Such instructions can cause a computer to perform the method.

IV. Exemplary Implementation Environment

Figure 19:
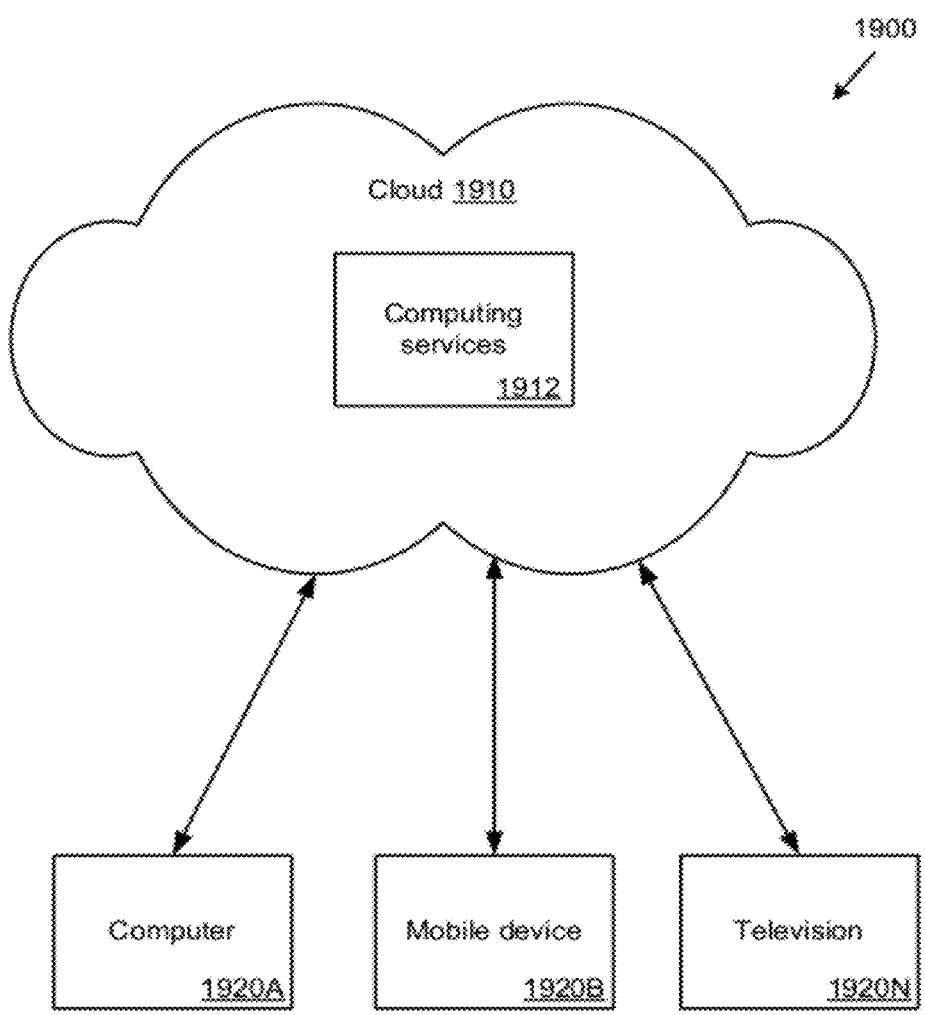
FIG. 19 is a block diagram of an exemplary cloud computing arrangement suitable for implementing technologies described herein.

FIG. 19 illustrates a generalized example of a suitable implementation environment 1900 in which described embodiments, techniques, and technologies may be implemented.

In example environment 1900, various types of services (e.g., computing services 1912, which can include any of the methods described herein) are provided by a cloud 1910. For example, the cloud 1910 can comprise a collection of computing devices, which may be located centrally or distributed, that provide cloud-based services to various types of users and devices connected via a network such as the Internet. The cloud computing environment 1900 can be used in different ways to accomplish computing tasks. For example, with reference to the described techniques and tools, some tasks, such as processing user input and presenting a user interface, can be performed on a local computing device, while other tasks, such as storage of data to be used in subsequent processing, can be performed elsewhere in the cloud.

In example environment 1900, the cloud 1910 provides services for connected devices with a variety of screen capabilities 1920A-N. Connected device 1920A represents a device with a mid-sized screen. For example, connected device 1920A could be a personal computer such as desktop computer, laptop, notebook, netbook, or the like. Connected device 1920B represents a device with a small-sized screen. For example, connected device 1920B could be a mobile phone, smart phone, personal digital assistant, tablet computer, and the like. Connected device 1920N represents a device with a large screen. For example, connected device 1920N could be a television (e.g., a smart television) or another device connected to a television or projector screen (e.g., a set-top box or gaming console).

A variety of services can be provided by the cloud 1910 through one or more service providers (not shown). For example, the cloud 1910 can provide services related to mobile computing to one or more of the various connected devices 1920A-N. Cloud services can be customized to the screen size, display capability, or other functionality of the particular connected device (e.g., connected devices 1920A-N). For example, cloud services can be customized for mobile devices by taking into account the screen size, input devices, and communication bandwidth limitations typically associated with mobile devices.

V. Extensions and Alternatives

Various alternatives to the examples described herein are possible. For example, techniques described with reference to flowchart diagrams can be altered by changing the ordering of stages shown in the flowcharts, by repeating or omitting certain stages, etc. As another example, some stages of described exemplary techniques can be modified. For example, in a natural language query tool that uses a cascaded CRF-based machine learning model, individual CRFs in the cascaded CRF model can be implemented as skip-chain, linear-chain or other varieties of CRFs.

The various examples described herein can be used in combination or independently. Technology described herein can be used in a computer system with software, hardware, or a combination of software and hardware.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A computer-implemented method, comprising:
 receiving natural language input at a computing device;
 processing the natural language input to generate an output, by:
  processing the natural language input in a first conditional random field to obtain a first stage output from the first conditional random field, the processing in the first conditional random field comprises:
   extracting at least a first entity and a second entity from the natural language input, wherein the first entity and the second entity appear separately in a natural language query expressed with the received natural language input, and at least one of the first entity and the second entity identifies a column name of a database table; and
   labeling the first entity as a database column value for the database table, and labeling the second entity as a database column name for the database table, the first stage output comprising a database column value label associated with the first entity and a database column name label associated with the second entity; and
  after processing the natural language input in the first conditional random field, processing the natural language input and the first stage output in a second conditional random field to obtain a second stage output from the second conditional random field, the processing in the second conditional random field comprising identifying at least one relationship between the first entity and the second entity in the first stage output, the second stage output comprising information that represents the at least one relationship,
 wherein the output comprises the first stage output and the second stage output; and
 forming a search query based at least in part on the output, wherein forming the query comprises determining a query type, wherein the query type is at least one of a range query, a logical query, a join query, or an aggregate query, and wherein the query is based at least in part on the query type.

2. The method of claim 1, wherein the second entity corresponds to a column in a database table.

3. The method of claim 2, wherein the first entity corresponds to a value in the column in the database table.

4. The method of claim 1, further comprising representing the at least one relationship as an edge between two nodes in a graph.

5. The method of claim 4, wherein the information that represents the at least one relationship comprises a start tag associated with one of the two nodes and an end tag associated the other of the two nodes.

6. The method of claim 4, wherein the second conditional random field is a skip-chain conditional random field, and wherein the edge is a skip-edge.

7. The method of claim 4, wherein a first node of the two nodes is associated with the column name label, and wherein a second node of the two nodes is associated with the column value label.

8. The method of claim 1, further comprising:
 sending the query to a search engine; and
 receiving database search results from the search engine in response to the query.

9. The method of claim 8, further comprising assigning relevance scores to the database search results.

10. The method of claim 9, further comprising:
 determining a match type for each of the database search results; and
 assigning a weight based at least in part on the respective match types, wherein the assigned relevance score for the respective database search results is based at least in part on the assigned weight.

11. The method of claim 9, further comprising determining an ordered set of search results based at least in part on the respective relevance scores.

12. The method of claim 1, wherein forming the search query is based at least in part on database metadata associated with at least one materialized view.

13. The method of claim 1, wherein determining the query type comprises applying one or more heuristic rules to the natural language input to identify one or more patterns in the natural language input that indicate the query type.

14. The method of claim 1, wherein the one or more heuristic rules comprise a heuristic rule that identifies one or more patterns in the natural language input that indicates quantitative comparisons.

15. The method of claim 1, wherein the one or more heuristic rules comprise a heuristic rule that identifies one or more patterns in the natural language input comprising one or more logical operators.

16. The method of claim 1, wherein the one or more heuristic rules comprise a heuristic rule that identifies one or more patterns in the natural language input comprising terms that indicate plural database tables, the method further comprising creating a materialized view for each of the plural database tables, wherein the join query is performed on the materialized views.

17. The method of claim 1, wherein the query comprises a combination of plural query types.

18. The method of claim 1, further comprising assigning part-of-speech tags to terms in the natural language input, wherein the extracting is based at least in part on the part-of-speech tags.

19. The method of claim 1, further comprising assigning relevance scores to database search results based at least in part on the first output and the second output.

20. One or more non-transitory computer-readable storage media having stored thereon computer-executable instructions which when executed by a computer cause the computer to perform a method, the method comprising:

receiving natural language input at a computing device;

processing the natural language input in cascaded conditional random fields comprising a linear-chain conditional random field and a skip-chain conditional random field to obtain an output from the cascaded conditional random fields, wherein:

the linear-chain conditional random field is used to extract entity information;

the skip-chain conditional random field is used to extract relationship information; and the skip-chain conditional random field is sequential to the linear-chain conditional random field so that an output of the linear-chain conditional random field is an input to the skip-chain conditional random field, wherein the linear-chain conditional random field and the skip-chain conditional random field are trained using a training dataset comprising entity labels and relationship labels; and based on the output from the cascaded conditional random fields, forming a database query, wherein forming the query comprises determining a query type, wherein the query type is at least one of a range query, a logical query, a join query, or an aggregate query, and wherein the query is based at least in part on the query type.

21. The computer-readable storage media of claim 20, the method further comprising executing the database query on an inverted index of a database.

22. The computer-readable storage media of claim 21, wherein the inverted index is based on one or more materialized views of the database.

23. The computer-readable storage media of claim 22, the method further comprising presenting query suggestions in the user interface.

24. The computer-readable storage media of claim 20, the method further comprising:

receiving results in response to the database query;

sorting the received results according to relevance scores; and presenting sorted results in a user interface.

25. The computer-readable storage media of claim 20, wherein the output comprises entity information and relationship information.

26. A computing device comprising one or more processors, one or more output devices, and one or more computer-readable storage media having stored therein computer-executable instructions for performing a method, the method comprising:

receiving natural language input at the computing device via a user interface, the natural language input comprising plural terms;

assigning a part-of-speech tag to each of the plural terms in the natural language input;

processing the natural language input and the part-of-speech tags in a linear-chain conditional random field to obtain a first output from the linear-chain conditional random field, the first output comprising a database column value label and a database column name label, the database column value label indicating that a first term in the natural language input corresponds to a column value in a database, and the database column name label indicating that a second term in the natural language input corresponds to a column name in the database, wherein the first term and the second term appear separately within the natural language input;

processing the natural language input and the first output in a skip-chain conditional random field to obtain a second output from the skip-chain conditional random field, the second output comprising relationship information that associates the first term corresponding to the column value in the database with the second term corresponding to the column name in the database;

forming a search string based at least in part on the first output, wherein forming the search string comprises determining a query type, wherein the query type is at least one of a range query, a logical query, a join query, or an aggregate query, and wherein the search string is based at least in part on the query type;

sending the search string to a search engine;

receiving search results identified in the database by the search engine based at least in part on the search string;

ordering the search results based on relevance scores for the respective search results, the relevance scores based at least in part on the first output and the second output; and presenting the ordered search results in the user interface.

* * * * *